Jan. 1, 1952  R. B. JOHNSON  2,580,787
IMPULSE-ACTUATED PROGRAM DEVICE
Filed Aug. 12, 1947  9 Sheets-Sheet 1

INVENTOR
Reynold B. Johnson
BY
Edward R. Lowndes
AGENT

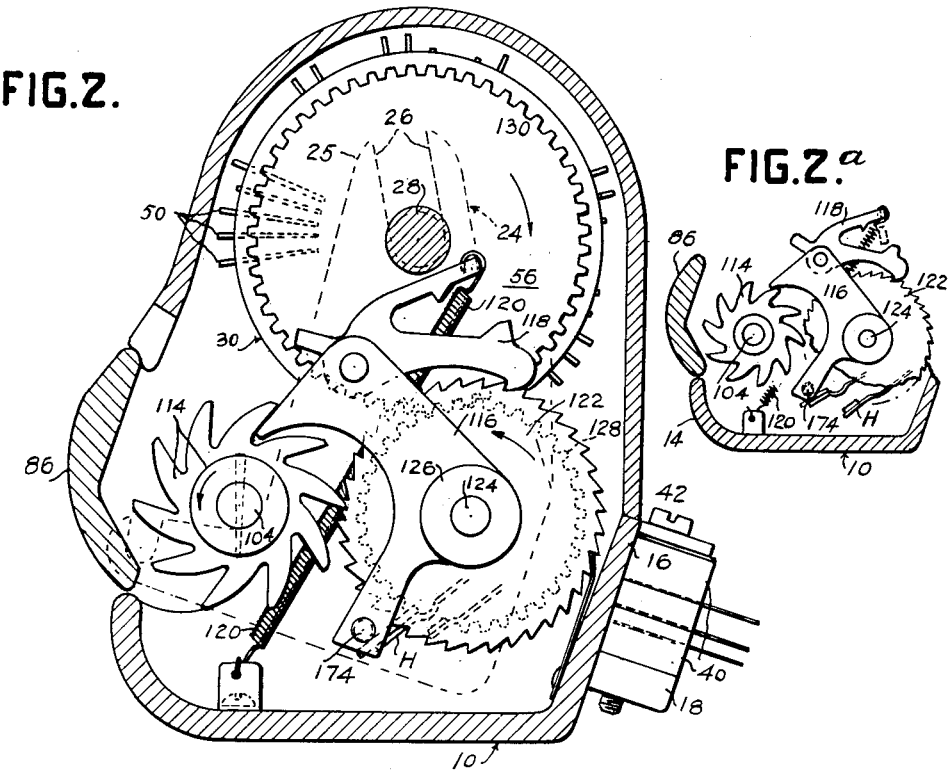
FIG.2.
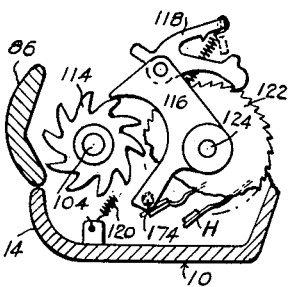
FIG.2.ᵃ
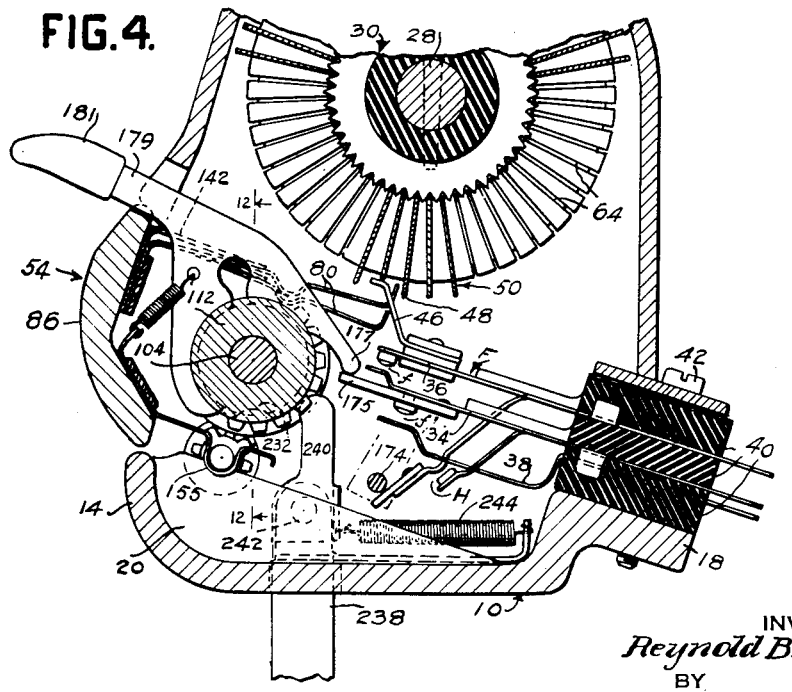
FIG.4.
INVENTOR
Reynold B. Johnson
BY
Edward R. Lowndes
AGENT

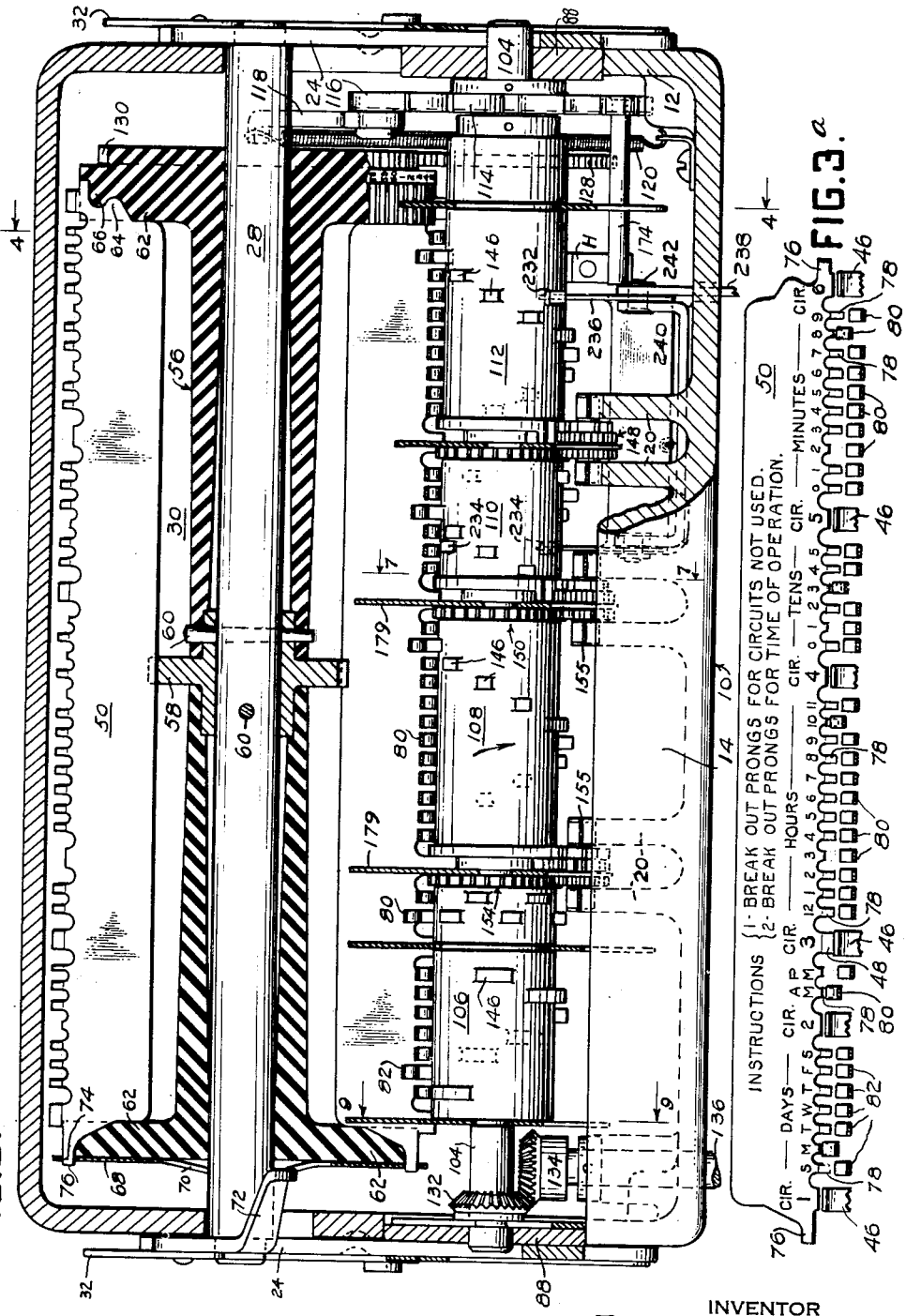

Jan. 1, 1952 R. B. JOHNSON 2,580,787
IMPULSE-ACTUATED PROGRAM DEVICE
Filed Aug. 12, 1947 9 Sheets-Sheet 4
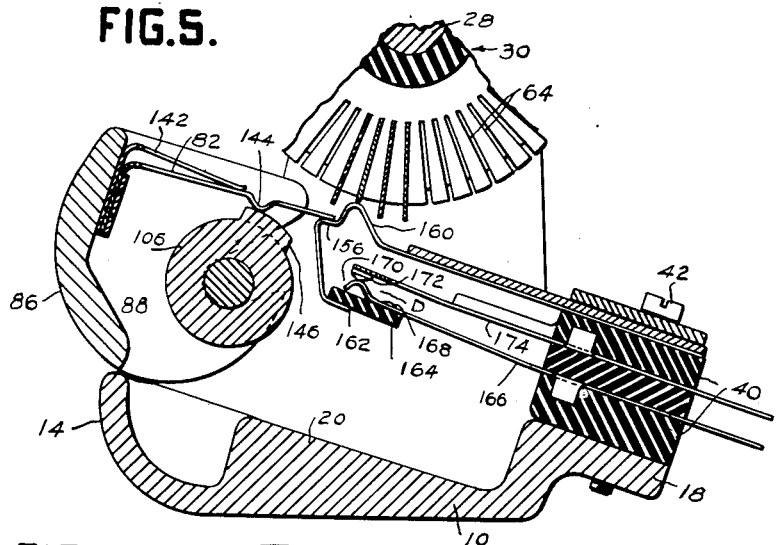
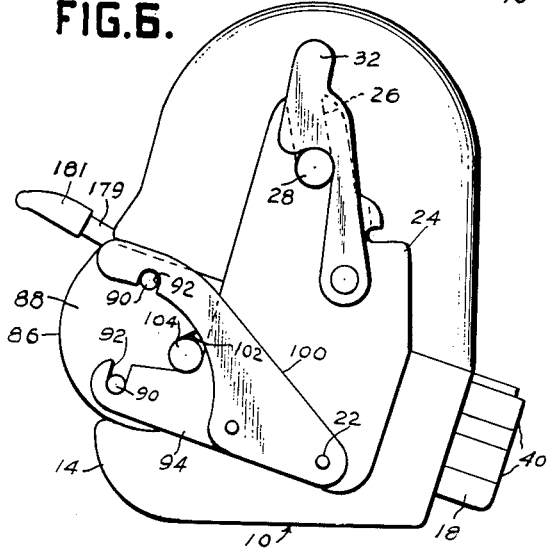
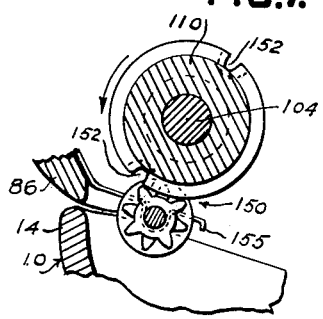
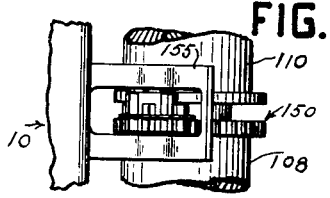
INVENTOR
*Reynold B. Johnson*
BY
*Edward R. Lowndes*
AGENT Jan. 1, 1952          R. B. JOHNSON          2,580,787
IMPULSE-ACTUATED PROGRAM DEVICE
Filed Aug. 12, 1947          9 Sheets-Sheet 5
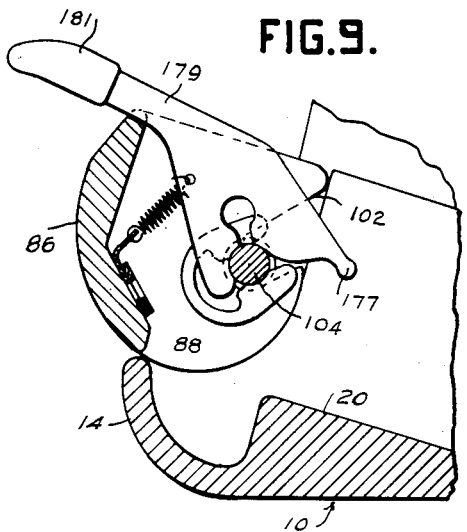
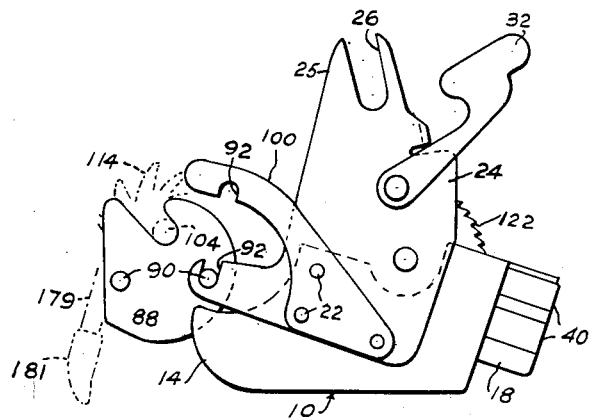
INVENTOR
*Reynold B. Johnson*
BY
*Edward R. Lowndes*
AGENT Jan. 1, 1952
R. B. JOHNSON
2,580,787
IMPULSE-ACTUATED PROGRAM DEVICE
Filed Aug. 12, 1947
9 Sheets-Sheet 6
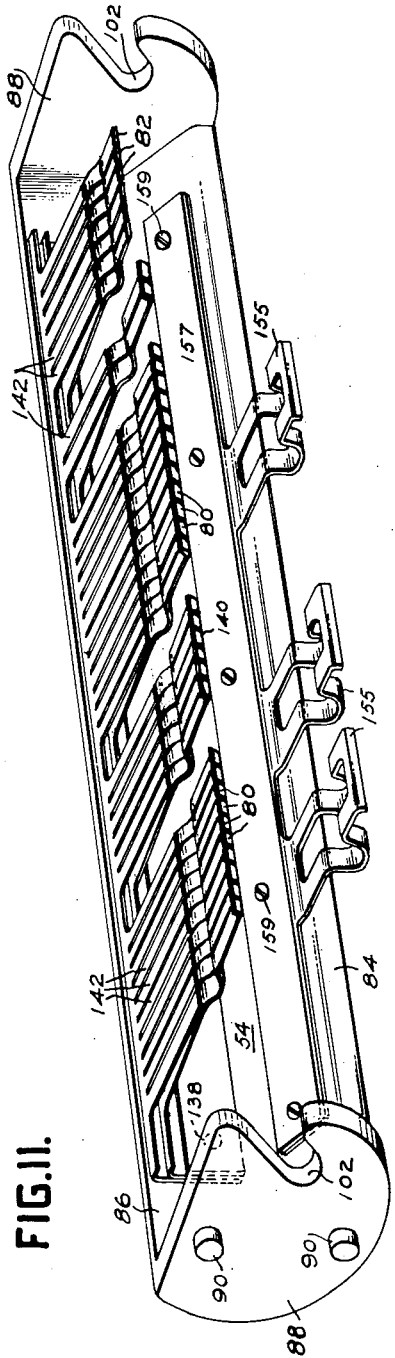
FIG.11.
FIG.12.
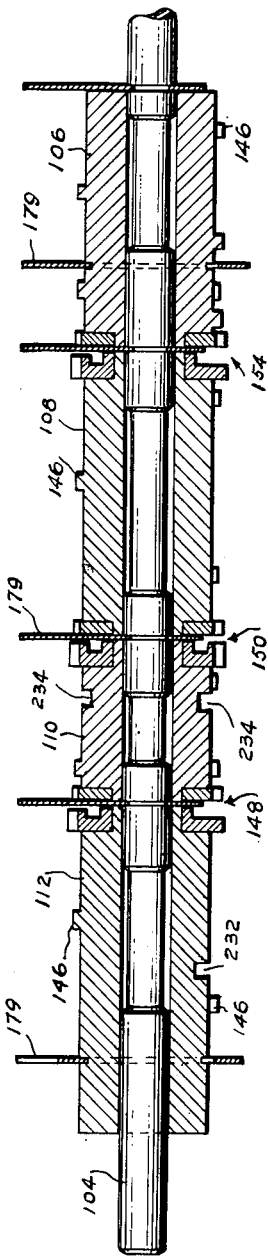
INVENTOR
*Reynold B. Johnson*
BY
*Edward R. Lowndes*
AGENT Jan. 1, 1952        R. B. JOHNSON        2,580,787
IMPULSE-ACTUATED PROGRAM DEVICE
Filed Aug. 12, 1947        9 Sheets-Sheet 7
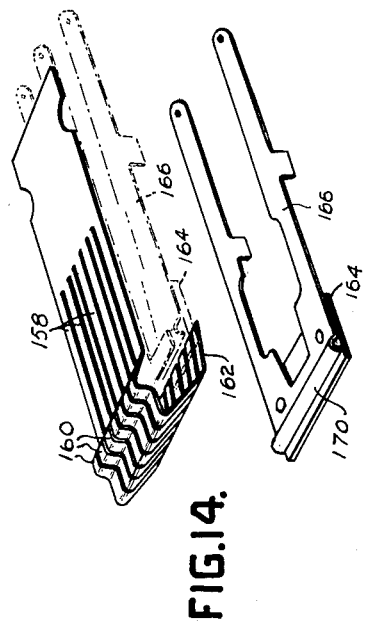
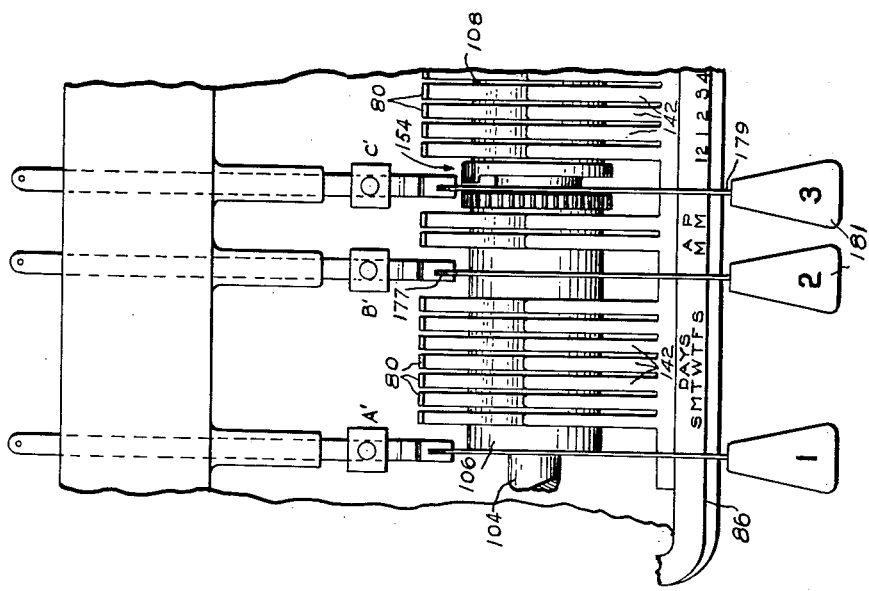
INVENTOR
*Reynold B. Johnson*
BY
*Edward R. Lowndes*
AGENT Jan. 1, 1952  R. B. JOHNSON  2,580,787
IMPULSE-ACTUATED PROGRAM DEVICE
Filed Aug. 12, 1947  9 Sheets-Sheet 8

INVENTOR
*Reynold B. Johnson*
BY
*Edward R. Lowndes*
AGENT

Patented Jan. 1, 1952

2,580,787

UNITED STATES PATENT OFFICE 2,580,787

IMPULSE-ACTUATED PROGRAM DEVICE

Reynold B. Johnson, Binghamton, N. Y., assignor to International Business Machines Corporation, New York, N. Y., a corporation of New York Application August 12, 1947, Serial No. 768,142

38 Claims. (Cl. 161—1)

The improved program device comprising the present invention is primarily adapted for use in connection with the automatic control of electrical circuits for carrying out a predetermined program, as for example the closing or opening of one or more electrical circuits at predetermined times of a day or a week for the operation of electric signals. Apparatus of this type is admirably well adapted for use in schools, offices, factory buildings, dispatcher's stations etc., for ringing bells, operating relays and in general for opening and closing electrical circuits for performing various scheduled operations according to some desired program. The present program instrument is adapted to be driven in response to a timing device so that the schedule is completed in a day or a week, as desired, and the circuit controlling device or devices of the instrument are capable of adjustment or alteration in such a manner as to permit of altering the daily program or of altering the program for the different days of the week.

The present program device is however capable of other uses and the same may if desired, with or without modification, be employed for a wide variety of uses as for example to operate machinery at predetermined times or to electrically control or instigate certain functions regardless of their nature according to a time schedule. Irrespective however of the specific use to which the present program device may be put, the essential features of the invention are at all times preserved.

Briefly, the invention in one form thereof, where a daily program is concerned, contemplates the provision of a series of normally open output circuits, each being adapted upon closing thereof to perform, either directly or indirectly, a desired electrical function, as for example the rendering of an audible or visual signal for a classroom or office program. Associated with each circuit are contacts for completing the same and the various contacts are adapted to be closed automatically at predetermined times by virtue of the character of and the movements imparted to a rotatable program drum, both of which are a function of the particular selected daily program.

The program drum involves in its general organization a series of sixty radially disposed, circumferentially arranged removable and interchangeable program bars having frangible contact-closing fingers or protuberances formed thereon designed for camming engagement in passing with the circuit-closing contacts. The movements of the drum are controlled by the cooperating or non-cooperating relationship between a series of frangible protuberances or teeth formed on the program bars and a series of arresting or stop fingers which are moved at definite and regular time intervals into the path of movement of the teeth on the program bars.

Under the control of a master clock forming a part of a synchronized clock system, at regular minute intervals, and by mechanical means, torque impulses are applied at minute intervals to the program drum tending to advance the same in step-by-step fashion one sixtieth of a revolution. Thus ordinarily the drum would be rotated once during each hour.

The stop fingers and cooperating teeth on the various program bars function in combinational arrangements, according to the distribution of teeth on the bars to allow the torque impulses to become effective to index or step the drum or to prevent them from doing so as the case may be. The various stop fingers are projected into the normal path of movement of the oncoming teeth on the various program bars and they are timed to so move that by the distribution of the teeth, i. e. the presence or absence of a tooth in a particular location or locations on a particular program bar, the program drum is or is not indexed or stepped at the particular moment that an indexing application of torque is applied to the same. Obviously if the drum is not indexed it remains stationary and the contact-closing protuberances on the program bars thereof are not effective to engage and close their respective circuit-closing contacts. Conversely, if the drum is indexed it moves one step and if a contact-closing protuberance is carried on a particular program bar it engages its respective contacts and effects closing thereof in passing during the indexing movement of the drum. It is also obvious that if no contact-closing protuberance is present on a particular program bar no circuit closing function will take place regardless of the indexing or non-indexing movements of the drum.

The various stop fingers as well as the cooperating teeth on the program clips are conveniently arranged in groups to simplify or assist an operator in making proper selection of teeth for removal purposes to place in effect a desired program. For daily program operation the fingers and the teeth on each program bar are grouped and operate as follows:

One group consisting of ten pairs of cooperating tooth and finger elements represents minutes of time and the stop fingers in this group are adapted to be projected into the path of the teeth on the oncoming program bar successively at minute intervals. Each stop finger remains in blocking position in engagement with its respective tooth one full minute before it is withdrawn and the next finger in the series is projected. If, upon withdrawal, no other finger in another group is in blocking position by virtue of its engagement with a tooth on the same program bar, the drum is permitted to advance when the torque impulse is applied. Otherwise the drum will not be advanced at this time. All of the stop fingers in this group will have been projected during the course of a ten minute interval.

Another group consisting of six cooperating tooth and finger elements represents ten minute intervals of time and function generally like the elements of the first group except that the stop elements of this group will be projected successively into the path of the oncoming teeth on the program bars at ten minute intervals and will remain thus projected for a similar length of time. Thus all of the stop fingers in this group will have been projected once during the course of one hour.

A third and similar group of twelve cooperating elements represents hour intervals of time and the fingers of this group are successively projected at hour intervals and each remains projected for a full hour before being retracted.

A fourth group consists of two cooperating pairs of elements and represents a. m. and p. m. time. The stop fingers of this group become effective alternately at twelve hour intervals and each is operated once in the course of a full day.

Where weekly program operations are contemplated a fifth group consists of seven cooperating pairs of elements, each pair representing a day of the week. The stop fingers of this group become effective for blocking purposes in succession at twenty-four hour intervals and each finger remains effective twenty-four hours until its successor becomes effective. The fingers of this group are each operated once during the course of one week.

Where daily program operations are concerned, i. e. where identical daily programs are resorted to for five or six days a week, the stop fingers of the last mentioned group are omitted and in their stead there are provided a series of seven normally open contacts which are arranged in parallel with one another and in series with each of the output circuit contacts. Occupying the same relative positions as the stop fingers in the other form of the invention are a series of seven operating fingers which normally maintain their respective contacts open but which are adapted to be operated upon by the same operating means for the stop fingers of the other or weekly adaptation of the invention. The operating fingers serve to close their respective contacts in succession at daily intervals and to maintain the same closed for a twenty-four hour period.

Where the weekly adaptation of the invention is concerned a definite weekly program is decided upon and a program bar is provided for each and every bell ringing or other output operation. The teeth of the bars which are commensurate with the selected program are broken from the bars and the contact-making protuberances of the bars which are not desired are also broken away. The prepared program bars are inserted in the program drum and upon commencement of the program operation a stepping impulse is applied to the drum at minute intervals during the entire week. Actual movement of the drum however will take place only when a predetermined combination of stop fingers and teeth on the program bars will permit of it and this occurs only when the time arrives for the closing of a desired output circuit. Thus, although the tendency for the drum is to rotate once during each hour (since each indexing operation when effective carries the drum six degrees) actually it will not arrive at its starting point until the end of the full weekly schedule During the interim, the drum will forcibly be retarded by various combinations between the stop fingers and teeth on the program bars until the moment when a particular signal is to be given. At that moment, due to the absence of all teeth which would ordinarily prevent movement of the drum, the program bar for the desired signal will be released and the next indexing impulse will become effective to advance the drum and effect the desired signal.

In the daily adaptation of the invention the same general operation takes place but, since certain program operations are to be repeated daily (during week days for example) the preparation of the program bars will be such as to permit the program drum to rotate once each day so that each program bar for these week days may perform its circuit closing operations repetitiously. Such program bars will be devoid of teeth in the daily section which correspond to week days but will have a tooth present in this section corresponding to Sunday. Similarly in the preparation of the program bar or bars which are to be effective only on Sunday, teeth will be provided in the daily section corresponding to week days but no tooth will appear in this section corresponding to Sunday. As a consequence, although the drum will perform a complete revolution once each day during the entire week, on week days repetitious circuit closing operations will take place while Sunday operations will be omitted. On Sunday, week day circuit closing operations will be omitted while only the Sunday schedule will take place.

The provision of an apparatus of the general character outlined above being the principal object of the invention, another object is to provide a program device of this nature in which the driving means for the program drum may be operated from a standard master clock circuit in the manner of an ordinary secondary clock instrument. In other words it is an object of the invention to provide the program drum with instrumentalities which operate to maintain the drum automatically in synchronism with the master clock during a major portion of each hour period and to either withhold the application of stepping impulses to the drum or to apply a rapid series of impulses thereto during a limited synchronizing period during the course of each hour to insure coincidence between the drum and master clock at the commencement of each hour period.

A further object of the invention is to provide a program device of this type which is conveniently constructed in three main or general assemblies or units, namely a base or housing unit, a program drum unit and a stop finger and operating unit, the three units being capable of ready assembly and disassembly with respect to one another and the three units, when assembled constituting a complete operative program instrumentality. A similar and related object is to provide such a device in which the three units may be assembled or disassembled conveniently by simple manual operations without the use of tools yet in which the various cooperating units, when assembled, will be securely held or locked in their cooperating relationship against dislodgment.

A still further object of the invention is to provide a program device of the character set forth above and having a program drum provided with interchangeable program bars in which the bars may be readily removed and replaced for purpose of program adaptation without necessitating removal of the drum from the assembly or of otherwise disassembling the device.

Yet another object is to provide a program bar having combinational teeth and contact closing protuberances thereon designed for use in the manner outlined above and in which both the teeth and protuberances are frangible for removal purposes in order that an operator may readily adapt a particular clip to a desired program schedule. In this manner uniform manufacture of the clips may be resorted to and the consumer may adapt the clips to his individual needs.

The provision of a program device which is relatively simple in its construction and positive in its operation; one which is comprised of a minimum number of moving parts and which consequently is unlikely to get out of order; one which is rugged and durable and which is therefore possessed of a comparatively long life; one in which the component parts thereof may be easily assembled, thereby contributing to a low cost of manufacture, and one which is otherwise well adapted to perform the services required of it are further desiderata that have been borne in mind in the production and development of the present invention.

In the accompanying nine sheets of drawings forming a part of this specification, two embodiments of the invention have been shown.

In these drawings:

Fig. 2 is a sectional view of one end of the program device taken along the lines 2—2 of Figure 1 with the program drum in assembled position.

Fig. 2A is a fragmentary diminutive detail view of certain details associated with the disclosure of Fig. 2 and illustrating a principle of operation of the apparatus.

Fig. 3 is a front elevational view of the interior of the program device with certain portions broken away and in section, a part of the exterior casing being removed also.

Fig. 3A is a plan view of a program bar employed in connection with the present invention and also showing its cooperation with a series of stop fingers with which it forms a combinational arrangement.

Fig. 4 is a fragmentary sectional view taken substantially along the line 4—4 of Fig. 3.

Fig. 5 is a fragmentary sectional view taken substantially along the line 5—5 of Fig. 1.

Fig. 6 is an end view of the program device with the cover plate in position and showing certain locking features whereby the various sub-assemblies of the device are maintained locked in position.

Fig. 7 is a sectional view taken substantially along the line 7—7 of Fig. 3.

Fig. 8 is a bottom plan view of the structure shown in Fig. 7.

Fig. 9 is a sectional view taken substantially along the line 9—9 of Fig. 3.

Fig. 10 is an end view of the partially disassembled program device illustrating the manner in which the sub-assemblies of the device are rendered removable.

Fig. 11 is an enlarged perspective view of a stop finger assembly showing the same in detached relationship.

Fig. 12 is an enlarged sectional view taken substantially along the line 12—12 of Fig. 4.

Fig. 13 is a fragmentary plan view similar to Fig. 1 and showing a portion of a program device which is designed to accommodate a weekly program schedule in which the daily schedule may vary from day to day.

Fig. 14 is a perspective view of a contact assembly employed in connection with the present invention.

In all of the above described views like characters of reference are employed to designate like parts throughout.

Figure 1:
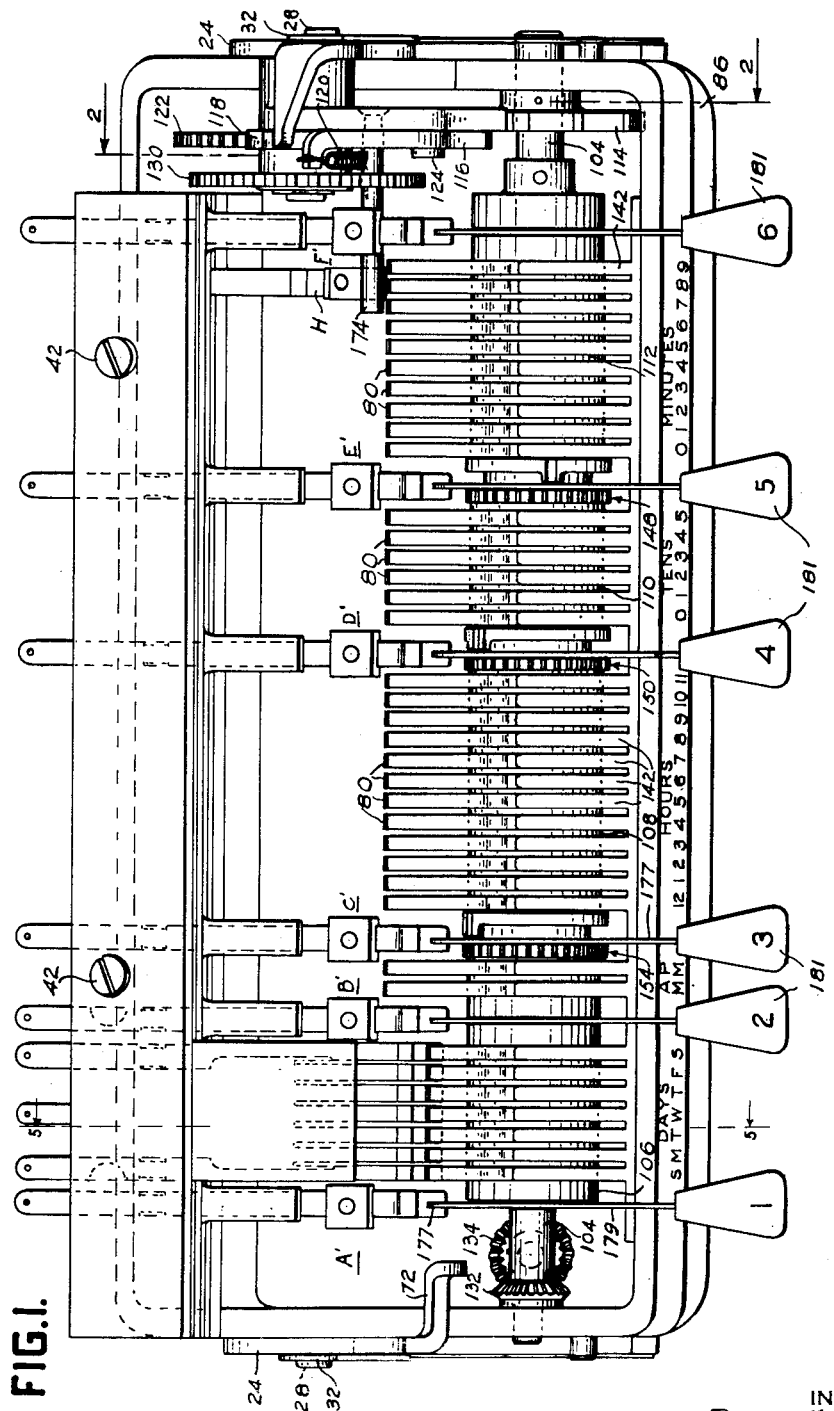
Fig. 1 is a plan view of an assembled program device constructed in accordance with the principles of the present invention. In this view the cover piece and the program drum unit or assembly have been removed and other parts have been broken away to more clearly illustrate certain portions of the device.

Referring now to the drawings in detail and in particular to Figs. 1, 2 and 4, the program device involves in its general organization a one-piece base plate 10 of elongated cup-shape configuration and formed with upturned side portions 12, a generally curved upstanding front portion 14, a pair of upstanding corner posts 16 at the rear thereof, and a rearwardly extending attachment flange 18 which is substantially coextensive to the rear of the base plate and which extends between the two posts 16. The base plate is also formed with three pairs of upstanding ribs or webs 20 which are generally of triangular configuration (see Figs. 3, 4 and 9) and which are provided for the purpose of lending support to a series of Geneva gear supporting clips the nature and function of which will be set forth presently.

The base plate is preferably formed of a suitable insulating material such as Bakelite and has riveted as at 22 or otherwise secured thereto at opposite ends a pair of upstanding metal side plates or standards 24 of irregular contour and the shape of which is clearly shown in Fig. 10. The standards 24 are each provided with upwardly presented tapered portions 25 formed with an open-ended slot 26 at the extreme upper end thereof. The slots 26 are adapted to removably receive therein the ends of the center shaft 28 of a program drum assembly designated in its entirety at 30. A pivoted keeper 32 at each end of the program device serves to lock the program drum in assembled position between the standards 24 and may be manually positioned to one side to permit removal of the drum as an assembled unit.

Figure 15:
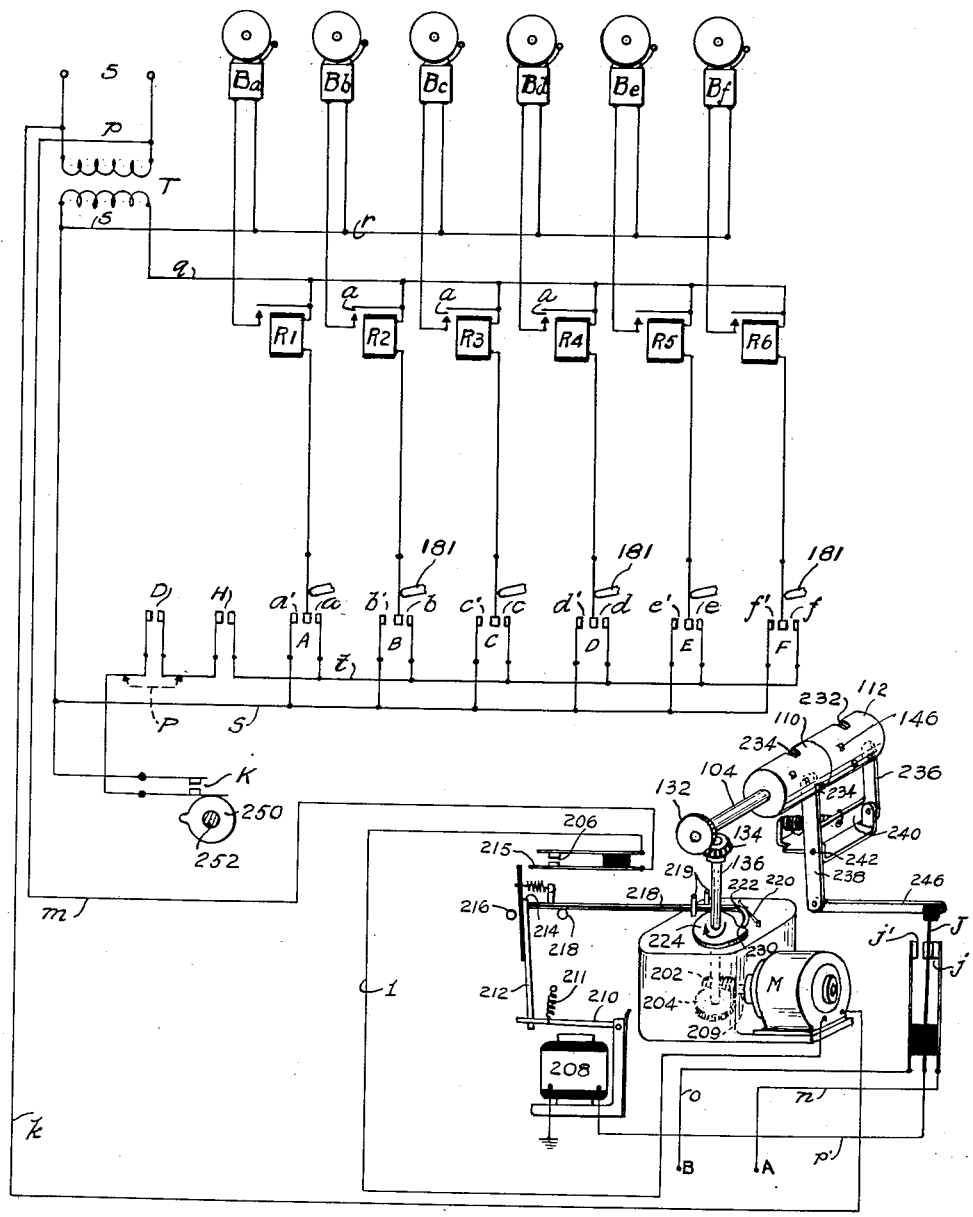
Fig. 15 is a wiring diagram of the electrical circuits associated with the program device and also showing the synchronized and time controlled driving mechanism therefor and its electrical circuits.

The program unit has been illustrated as being capable of accommodating six output circuits which, as stated heretofore, may be employed for controlling respective bell ringing circuits in accordance with a predetermined daily schedule. These six output circuits are illustrated in Fig. 15 and will be described in detail hereinafter but for the present it is deemed sufficient to state that they are adapted to become effective upon closing of respective pairs of contacts *a, b, c, d, e* and *f* under the influence of the drum assembly 30. Additional pairs of contacts *a', b', c', d', e'* and *f'* are included in the various bell-ringing circuits and are adapted to be closed manually as will presently be described.

The pairs of contacts *a, a', b, b', c, c',* etc. appear in Figs. 1, 3A, 4 and 14 and are each in the form of two-way contact groups A', B', C', D', E' and F' respectively, the group F being shown in detail in Fig. 4. Each contact group includes a medial contact arm 34 and upper and lower arms 36 and 38 respectively designed for cooperation therewith to permit selective closing of the contacts *a* or *a'* as the case may be. The arms 34 and 36 are flexible while the arm 38 is substantially rigid and it may be seen that downward flexing of the arm 36 will bring the contacts *f* into engagement while downward flexing of the arm 34 will close the contacts *f'*. The arms 34, 36 and 38 are supported from the flange portion 18 of the base plate 10 by means of insulating strips 40, the entire contact assembly A to F inclusive being clamped in position by means of clamping bolts 42 (Figs. 1 and 4). Each of the arms 36 has secured thereto as at 44 an upstanding finger 46 which normally projects into the path of movement of a tooth 48 formed on each of a series of program inserts or bars 50 associated with the drum assembly 30 and the arms 36 are adapted, by a camming action with the teeth 48 in passing to be depressed to close their respective contacts *a, b, c, d, e* or *f* as the case may be.

The base plate 10 and all of the instrumentalities secured thereto and associated therewith such as the contact groups A' to F' inclusive as well as certain drum indexing ratchet mechanism and other devices yet to be described may be considered as component parts of a complete base plate assembly which is designated in its entirety at 52 (Fig. 10). This assembly 52 constitutes one of three main machine assemblies which cooperate to make up the entire program instrument. The previously described drum assembly constitutes the second main assembly. A third main assembly in the form of a stop finger and operating assembly 54 is adapted to be removably associated with the two other assemblies and its nature and function will be set forth in detail hereinafter.

The drum assembly 30, in addition to the previously described shaft 28, involves in its general organization a drum proper 56 (Figs. 2 and 3) of spool-like design and comprised of right and left components separated on the shaft 28 by means of a serrated collar 58, the three parts being secured on the shaft by means of taper pins 60. The end flanges 62 of the spool-like drum 56 are provided with opposed internal radially disposed slots 64 in which the previously mentioned program bars 50 are removably received.

While in the present instance for purposes of illustration sixty such radial slots have been shown to accommodate sixty of the program bars, a greater or lesser number thereof may be employed if desired. For reasons that will become apparent presently, sixty program bars have been employed so that each bar may represent one minute interval of time when the drum is indexed or stepped at the rate of one revolution per hour.

An individual program bar 50 is shown in detail in Fig. 3A and its radial disposition in the program drum 56 is illustrated in Figs. 2 and 4. Each program bar is in the form of a flat metal strip having irregular end contours as shown in Figs. 3 and 3A which mate with the sides and bottoms of the radial slots 64 and which are of such configuration that the bars may be inserted in the various pairs of opposed slots in only one position. A shown at the right hand side of Fig. 3, a protuberance 66 on each bar serves to lock one end of the bar in position in the drum while at the other end a circular plate 68 is pressed against the end of the drum by means of a yieldable outwardly bowed portion 70 which bears against an inturned arm 72 formed on the standard 24. A series of circularly arranged apertures 74 are formed near the periphery of the plate 68 and are adapted to receive therein projections 76 which are formed on the ends of the plates 50. From the above description it will be seen that the various program bars 50 are securely and positionally locked in the drum assembly while the latter is itself definitely positioned or centered by means of the yieldable bowed portions 70 which take up any lost motion.

The previously mentioned operating teeth 48 which cooperate with the contacts *a, b, c,* etc. are variously spaced along an edge of the program bar and each tooth is provided with a score line by means of which it is readily broken off when it is not required to perform any useful function in connection with a desired program. The positions of the various teeth have been labeled in Fig. 3A according to the particular output circuit whose operation they control. In this view the teeth for output circuits 1, 2, 4, 5 and 6 have been shown as broken away while only the tooth for circuit 3 remains intact.

Each program bar 50 is also formed with additional teeth 78 along the same edge as the teeth 48 and these teeth are designed for cooperation with respective stop fingers 80 included in the assembly 54 in combinational arrangements for arresting the indexing movements of the drum 56 at certain times and for permitting such rotation at other times. A group of teeth 78 at the left end of the program bar, instead of being designed for cooperation with stop fingers such as are shown at 80, are designed for cooperation with a series of contact-closing arms 82 (Figs. 5, 11 and 14) which control the opening and closing movements of a pair of contacts D, hereinafter referred to as the day contacts, all in a manner for a purpose that will be pointed out presently.

The teeth 78 are for convenience of identification by the operator divided into five groups which, reading from left to right in Fig. 3A, are as follows:

(1) A day group consisting of seven teeth labeled S, M, T, W, T, F, S, to represent the seven days of the week.

(2) An a. m.-p. m. group consisting of two teeth representing morning and afternoon time. The two teeth are labeled A and P.

(3) An hour group consisting of twelve teeth labeled 12, 1, 2, 3, 4, 5, 6, 7, 8, 9, 10, 11 to represent the twelve hours of each day and night.

(4) A ten minute group labeled "tens" consisting of six teeth labeled 0, 1, 2, 3, 4, 5 to represent the tens digit of the minutes of each hour.

(5) A minute group consisting of ten teeth labeled 0, 1, 2, 3, 4, 5, 6, 7, 8, 9 to represent the minutes of each hour.

The first group of teeth is designed for cooperation with the contact operating arms 82 of Fig. 5 while all of the other groups are designed for cooperation with the arresting or stop fingers 80 of Fig. 4.

As previously stated, means are provided for applying a torque to the drum assembly 30 at minute intervals each and every minute of every hour and every day of the week, such application of torque normally tending to index the drum one stop or one-sixtieth of a revolution. In the absence of any program bars in the drum assembly such a procedure would normally cause rotation of the drum one revolution each hour. However if a daily program is to be carried out and a single clip representing a single bell ringing operation daily, or a plurality of clips representing a like number of bell ringing operations which are to be performed daily, is or are present in the drum, then the movements of the drum will be arrested so that the torque applying operations cannot take effect at certain times and can only take effect when bell ringing operations are in order. In such instances although applications of torque are applied to the drum each minute, the drum will complete but one full revolution daily. This will become clear when the nature and operation of the various stop fingers 80 is fully understood.

The stop fingers 80 are included in the removable stop finger assembly 54 and the latter includes a base or casing 84 including a front piece 86 and side pieces 88 which are suitably secured thereto at its ends. A pair of lugs or pins 90 (Figs. 6, 10 and 11) are formed exteriorly on the side pieces 88 and are adapted to be received within slots 92, one of which is formed in an extension 94 of the side plates 24 and the other of which is formed in a separate bracket 100 at opposite ends of the device. The bracket 100 is formed of light flexible sheet metal and as a consequence by manually spreading the ends of the same apart the pins 90 are released and the entire stop finger assembly may be swung from the position shown in Fig. 6 to that shown in Fig. 10 after which the assembly may be disengaged from the slots 92.

The side pieces 88 of the stop finger assembly 54 are formed with slots 102 therein and in these slots there are removably received the opposite ends of a shaft 104 the function of which is threefold. The shaft 104 may be termed a cam supporting, cam actuating and drum driving shaft inasmuch as it serves to support thereon a series of four interrelated cam sleeves which, reading from left to right in Fig. 3 are designated at 106, 108, 110 and 112, and to impart motion to these cam sleeves, as well as to impart increments of motion to the drum assembly 30 at minute intervals.

For drum driving operations there is secured to the shaft 104 near one end thereof, and just within the side piece 88, a ratchet wheel 114 (Figs. 2, 3 and 10) and this ratchet element is designed for cooperation with a two-piece, spring pressed follower pawl assembly including a driven pawl element 116 and a drum driving pawl element 118, the latter being biased by a spring 120 which serves to normally urge the pawl element 116 into engagement with the ratchet wheel 114 and to urge the pawl element 118 into engagement with the toothed periphery of a driving ratchet wheel 122 mounted on a stub shaft 104 which extends inwardly from the side plate or standard 24.

The ratchet wheel 122 is integrally formed on a sleeve 126, together with a driving gear 128, the latter meshing with a gear 130 mounted on and secured to the drum-supporting shaft 28 when the various assemblies 30, 52 and 54 are in operative position in the device.

The shaft 104 carries near the end opposite to the end on which the ratchet wheel 114 is carried a bevel gear 132 which meshes with a similar bevel gear 134 mounted on the end of a shaft 136. The shaft 104 is adapted to be driven or indexed periodically through a thirty-six degree angle at one minute intervals continuously throughout each twenty-four hour period by mechanical means which is shown schematically in Fig. 15. Such a means is adapted to operate under the control of a standard master and secondary clock system, as for example the system described and illustrated in the patent to Bryce, No. 1,687,491, dated October 16, 1928, or by any other suitable system having means which may be adapted for synchronizing the periodic movements of the shaft 104 with a master clock such as is shown in the Bryce patent and also having means which may be adapted for synchronizing the movements of the drum assembly 30 with clock time as represented by the master clock. The nature of the synchronizing system and of the mechanical driving means will be briefly set forth hereinafter but for the present it is deemed sufficient to state that periodic impulses emanating from the master clock are applied as torque impulses to the shaft 104 at regular one minute intervals to index the latter one-tenth of a revolution to actuate the ratchet and pawl instrumentalities 114, 116, 118 and index the drum one step when the latter is free and susceptible to such impulses.

From an inspection of Figs. 2 and 3 it will be seen that when the drum is free to rotate, stepping movement of the ratchet wheel 114 will cause the tooth of the follower pawl 116 to ride outwardly on one of the teeth of the ratchet wheel, thus causing the tooth on the driving pawl 118 to fall behind one of the teeth of the ratchet 122. After the tooth on the pawl 114 clears the end of the tooth on the ratchet wheel 114, the spring 120 causes the pawl 116 to be moved in a counterclockwise direction to advance the drum assembly. If however the drum assembly is not free to be moved by virtue of engagement between one of the stop fingers 80 and its corresponding tooth 78 on one of the program bars, the entire pawl assembly 116, 118 will be retarded and subsequent indexing operations of the ratchet wheel 114 will be ineffective.

The previously mentioned stop fingers 80, as well as the contact closing arms 82 are preferably all formed as a single unit as shown in Fig. 11 which may be of copper stock and which is secured as at 138 (Figs. 2 and 11) to the inside face of the front piece 86. The fingers project inwardly of the assembled device in parallelism and the free ends thereof are turned upwardly as at 140 and are adapted to be projected into the path of movement of the teeth 78 formed on the various program bars 50. A series of spring elements 142 overlie the stop fingers 80 and contact actuating fingers 82 and normally bias the same downwardly. Each stop finger 80 and contact actuating finger 82 is formed medially with a cam protuberance 144 adapted to cooperate with respective cam fingers 146 formed on the various cam sleeves 106, 108, 110 and 112.

The cam sleeve 112 is secured to the shaft 104 and underlies the end or minute group of ten stop fingers (see also Fig. 3A) and the cam fingers 146 on this sleeve are arranged in spiral fashion about the periphery of the cam sleeve, the spacing between adjacent fingers being such that as the sleeve is rotated throughout one complete revolution during the course of each ten minute period in unison with the shaft 104 upon which it is mounted, the stop fingers of the group under consideration are elevated in succession from left to right as viewed in Figs. 3A and 11 are maintained elevated for a full minute period, and are then lowered again out of the path of the teeth 80.

The cam sleeve 110 underlies the next group of teeth 80 which is the tens order of minutes group and this sleeve is loosely mounted on the shaft 104 and is adapted to be driven from the sleeve 112 by means of a conventional Geneva carry-over mechanism 148 (see also Fig. 12) of the type employed for effecting movements of the counter wheels in a cyclometer system of the type shown, for example, in the patent to Ward Leathers, No. 2,469,655, dated April 10, 1949. Obviously other types of carry over driving mechanism may be employed, it being sufficient that for each revolution of the sleeve 112 over a ten minute period, the sleeve 110 be advanced or indexed one step of thirty degrees. In other words, the sleeve 110 will make one complete revolution once in two hours. The cam fingers 146 on the sleeve 110 are spirally arranged in two groups of six fingers each and they are spaced 30° apart so that during each hour the stop fingers 80 are elevated in succession from left to right and are maintained elevated for a full ten minute period, after which they are again lowered out of the path of movement of the teeth 78.

The cam sleeve 108 underlies the hour group of stop fingers 80 and is loosely disposed upon the shaft and is adapted to be indexed by a conventional Geneva gear mechanism 150 throughout an angle of 30° (i. e. one-twelfth of a revolution) once each hour. Since the next adjacent cam wheel 110 makes a complete revolution but once in two hours, it is obvious that the Geneva mechanism 150 will have incorporated therewith provision for two transfer grooves 152 180° apart adapted to institute carry over operations at each half revolution of the sleeve 110. The cam fingers 146 on the cam sleeve 108 are twelve in number and they are spirally arranged and spaced so that they will cause the stop fingers 80 to become elevated in succession hourly with each finger remaining elevated one full hour in the path of movement of the teeth 78.

The cam sleeve 106 underlies the day group of contacts and the Geneva gear mechanism 154 is so designed as to index the sleeve one-seventh of a revolution (i. e. 51³/₇ of a revolution) each twelve hour period. A series of cam fingers 146 underlies each of the two stop fingers 80 of the a. m.-p. m. group and the fingers of the two series are staggered as shown in Fig. 3 and are so spaced that upon each indexing operation of the sleeve 106 the two fingers will alternately be projected into the path of movement of the teeth 78 on the program bars 50 and remain projected for a full twelve hour period.

The various Geneva gear carry-over mechanisms 148, 150 and 154 are supported in spring clip-like retainers 155 which are integrally formed with a metal strip 157 secured as at 159 to the base or casing 84 of the stop finger assembly 54 (see Fig. 11). These elements 155 receive their support in the assembled program device by resting upon the triangular webs 20 which, as stated previously, are formed in pairs with the webs of each pair straddling the Geneva carry-over gear mechanisms proper.

A spirally arranged series of seven cam fingers 146 are provided on the cam sleeve 106 and are designed for cooperation with the contact operating arms 82 which in turn cooperate with the day group of teeth 78 on the program bars. The spacing of these latter fingers is such that the various arms 82 will be elevated in succession daily and will remain elevated for one full twenty-four hour period before again becoming lowered.

Referring now to Figs. 5, 11 and 15, the previously mentioned single pair of day contacts D is common to all of the operating arms 82 and these latter arms are in the form of spring fingers which are supported from the base or casing 84 of the stop finger assembly 54 and which are biased downwardly by the spring elements 142. These fingers 82 bear downwardly against shoulders 156 formed on a series of contact supporting arms 158 which are secured by the clamping bolts 42 to the flange 18 of the base member 10. The arms 158 are provided with cam protuberances 160 and downwardly and rearwardly turned ledge portions 162, the latter serving to individually support an insulating strip 164 carried at the outer end of a bifurcated contact arm 166.

The outer end of the arm 166 is secured as at 168 to the insulating strip 164 and is formed with a contact rib 170 forming one element of the pair of day contacts D; the other end cooperating contact element 172 being carried at the outer end of a contact arm 174 secured to the flange by means of the studs 42. The day contacts D are normally maintained or biased to their open position by the inherent resiliency of the arms 166, 174, and they also are allowed to remain normally open by the resiliency of the arms 142 which bear against the sholders 156 of their respective arms 158 and maintain these arms depressed to allow the contact rib 170 to draw away from the contact element 174.

It should be understood that although the contacts D are biased so that they normally tend to remain open, they will nevertheless, in the absence of a tooth in the day group of teeth on a cooperating program bar, become closed inasmuch as one of the seven contact fingers 146 will always be in elevating engagement with one of the cam protuberances 144. In other words, during the entire day of Monday for twenty-four hours the Monday arm 82 will remain elevated and as a consequence the respective arm 158 will be elevated so that the ledge portion 162 thereof will elevate the insulating strip 164 and contact rib 170 to close the day contacts D. Similarly all day Tuesday the Tuesday arm will effect a similar contact closing operation and the same is true for each and every day of the week. If it is desired that the day contacts D shall not remain closed on any particular day of the week to omit a particular circuit closing operation, it is merely necessary that the particular program bar controlling that function have formed thereon a tooth in the corresponding day position so that this tooth will engage the protuberance 160 on the arm 158 in passing and hold the arm depressed against the counter action of the cam finger 146 and protuberance 144 to prevent closing of the day contacts D.

Referring now to Figs. 1, 3, 4 and 14, a pair of normally open contacts H are supported from the ledge portion 18 of the casing 10 and are adapted to be closed periodically by the action of an arm 174 (see also Fig. 2) secured to the driven pawl member 116. This latter contact insures that the various output circuits $a$, $b$, $c$, $d$, $e$ and $f$ remain open at all times except when they are actually required and closed for bell ringing operations by the action of their respective teeth 48 on the program bars 50.

Means are provided whereby any one of the six output circuits under the control of the contact groups A', B', C', D', E' and F' may selectively be closed at will. Toward this end each of the medial contact arms 34 of the contact groups (Fig. 4) is provided with an insulating piece or finger 175 which is positioned in the path of movement of a finger 177 carried on a lever 179 (see also Figs. 1 and 9). The various levers 177 are pivotally mounted on the cam sleeves 106, 108, 110, 112 at suitable spaced points therealong so that they are positioned for registry with the respective contact groups whose operations they control. The free ends of the levers 179 rest upon the front piece 86 of the stop finger assembly 54 and are provided with finger pieces 181 which, upon manual elevation thereof serve to close the respective contacts $a'$, $b'$, $c'$, etc. and render the corresponding output circuit effective for bell ringing operations.

Referring now to Fig. 15 wherein the operating mechanism for applying periodic impulses to the cam supporting shaft 104 through the bevel gears 132 and 134 is shown and wherein the circuit diagram for the program device is also illustrated, an electric motor M has a drive shaft 200 which operates through a worm and gear combination 202, 204 to apply periodic torque impulses to the shaft 136 and thus in turn drive the shaft 104 periodically.

The electric motor is adapted to be periodically driven by virtue of its circuit which leads from one side of a source of electric current S through a wire $k$, the motor M, wire $l$, a pair of normally open contacts 206 and wire $m$ to the source S. The contacts 206 are adapted to be periodically closed by periodic electrical impulses applied to an electromagnet 208 from sources A or B, as the case may be, these latter sources being associated with a standard master and secondary clock system of the type shown and described in the above mentioned patent to Bryce and the nature of which will be set forth presently.

The magnet is provided with an armature 210 which is spring pressed as at 211 and having pivotally secured thereto a contact-operating arm or rod 212 provided with a shoulder 214 thereon. With the magnet 208 deenergized the arm 212 is adapted to assume an elevated position wherein its upper end is out of engagement with a finger 215 associated with the contacts 206 and wherein the arm 212 bears against a stop pin 216. The arm is normally urged into this position by means of a cam follower 218 which is mounted in guides 219 and which is spring pressed as at 220 and which has an end thereof bearing against one side of the arm 212 immediately below the shoulder 214. The other end of the follower 218 is reversed as at 222 and bears against the surface of a cam 224 mounted upon the shaft 136. A spring 226 connects the arm 212 and follower 218. Upon energization of the magnet 208 due to the application of an electrical impulse thereto from either the source A or B, the armature 210 thereof is attracted and the arm 212 is lowered sufficiently to cause the shoulder 214 to clear the end of the follower 218 and assume a position directly therebeneath with the end of the arm 212 underlying the finger 215. The impulse applied to the magnet 208 is of but short duration and upon deenergization of the magnet the arm 212 is carried upwardly, thus closing the contacts 206 and completing the motor circuit. As the motor commences to operate, the cam 224 is rotated in the direction indicated by the arrow and the end of the follower 218 rides outwardly on the surface of the cam, this drawing the follower 218 to the right as viewed in Fig. 14 and also swinging the arm 212 to the right until such time as it engages the stop 216 after which the end of the follower is drawn away from the shoulder 214 and moves downwardly and rests upon the stop 216 with its end engaging the side of the arm 212 below the level of the shoulder. The cam 224 is provided with a drop off portion 230 and, when the end of the follower encounters this drop off portion the various parts of the system are restored to their normal positions with the end of the arm 212 out of engagement with the finger 215 so that the contacts 206 may become open. During this time from the initial application of an impulse to the magnet 208 until restoration of the various parts to their normal positions the shaft 136 will have completed one revolution and this movement will be imparted to the cam shaft 104 which also makes one revolution. Except for certain synchronizing operations taking place during a synchronizing period as will be described presently, the impulses applied to the magnet 208 take place at regular minute intervals.

Referring now to Figs. 3, 4 and 15, the cam sleeve 112 associated with the minutes group of cam fingers 80 has formed therein a cam slot 232 while the cam sleeve 110 associated with the tens of minutes group of fingers is provided with a pair of diametrically opposed cam slots 234. The slots 232 and 234 are designed for cooperation with the free ends 236 and 238 of a fork member 240 which is pivotally mounted on a shaft 242 carried by the casing 10 and which is spring pressed at 244 in such a manner as to normally bias the member 240 for counter-clockwise movement as shown in Fig. 4 to cause the free ends of the same to bear against the surfaces of the cam sleeves 110 and 112. The member 240 is provided with an extension or finger 246 which cooperates with a contact group J including normally closed contacts $j$ and normally open contacts $j'$. It will be seen that the contacts $j$ remain closed whenever one or the other of the free ends of the forked member 236 occupy a peripheral position on the surfaces of the cam sleeves 110 and 112. When however one of the two cam slots 234 provided in the sleeve 110 becomes aligned with the slot 232 provided in the sleeve 112, both ends 236 and 238 may enter these slots, thus permitting the member 240 to be swung in a clockwise direction as viewed in Fig. 4 and thus shifting the contact group J so that the contacts j' become closed.

The arrangement of the cam sleeves 110 and 112 with the respective slots 234 and 232 corresponds to the provision of the synchronizing cam 23 shown and described in the above mentioned patent to Bryce while the contact group J corresponds to the contact group 25, 26 of the patent. The ground point C and the circuit points A and B of the cricuit diagram of Fig. 14 also correspond to the ground point C and the points A and B of the patent. The synchronizing functions carried out by these various parts of the present disclosure are similar to the synchronizing functions of the patent wherein normal impulses are applied to the magnet 208 to maintain the various cam sleeves 106 to 112 inclusive in synchronism with the master clock and whereby rapid impulses may be applied to this magnet to step up the speed of operation of the cam sleeves if they are found to lag at the commencement of a so-called synchronizing period or whereby normal impulses may be withheld during the synchronizing period if they are found to be in advance of the master clock.

Referring now to the diagram (Fig. 15) the first operation to be described will be the normal impulse operations for controlling the operation of the shaft 104 and consequently of the various cam sleeves 106 to 112 inclusive. During non-synchronizing time minute impulses are transmitted from both points A and B as described in the patent and as a consequence the position of the contacts j, j' is of no consequence and these impulses will reach the magnet 208 through either wires n or o and the common wire p. This supply of minute impulses to the magnet 208 continues during each hour period until the synchronizing period begins.

If the condition of the various cam sleeves is assumed to be in advance of the master clock, the two ends 236, 238 of the forked member 240 will enter the aligned slots 232, 234 in the sleeves 112 and 110 respectively in advance of the normal time for this event and as a consequence the contacts j' will become closed and the contacts j will become open. During the synchronizing period only normal impulses are transmitted from the source A and as a consequence no further normal minute impulses can reach the magnet 208 through the wire n. The shaft 104 and consequently the cam sleeves will remain stationary until the end of the synchronizing period.

If the condition of the cam sleeves is assumed to be slow with respect to the master clock, the contacts j will be closed at the commencement of the synchronizing period and as a consequence rapid impulses emanating from the source A will reach the magnet 208 thus stepping the shaft 104 rapidly until such time as the ends 236, 238 of the fork member 240 enter the slots 232, 234 to transfer the contacts of the contact group J. After such transfer of the contacts the circuit leading from the source A or rapid impulses will be open and only normal impulses over the line o leading from the source B will reach the magnet.

If the cam sleeves are assumed to be in time with the master clock at the commencement of the synchronizing period as described in the Bryce patent, the contacts j will remain open so that rapid impulses from the source A cannot reach the magnet 208 and only the normal minute impulses coming over the line B can be effective.

Still referring to Fig. 15, the various bell circuits are arranged in parallel and include bells designated at Ba, Bb, Bc, Bd, Be and Bf. These bells operate from the secondary winding S of a transformer T having a primary winding P. The circuit for any particular bell, as for example the bell Bc leads from one side of the winding S through common wire q, contacts a of a relay magnet R3, bell Bc and common wire r to the other side of the winding S.

The relay magnet R3 is disposed in the output circuit of the program device and operates under the control of the group of contacts c and C' (see also Fig. 1) either for automatic operation by means of the program drum utilizing the contacts c or for manual operation utilizing the finger piece 181 and contacts c'. Where manual operation is resorted to the circuit involved leads from one side of the secondary winding S, through common wire s, contacts c', relay magnet R3 and common wire q to the other side of the winding S. For automatic program operation the circuit for the relay magnet R3 leads from one side of the secondary winding S, through a pair of cam controlled duration contacts K, day contacts D, safety contacts H, common wire t, contacts c, relay magnet R3, and common wire q to the other side of the secondary winding S.

The duration contacts K just mentioned are arranged in series with the arm contacts H and the various contacts of the groups A, B, C, etc., (also see Fig. 1) and they are adapted to be momentarily closed at minute intervals to control the duration of closure of the various output circuits and to render such duration uniform for all circuits involved. Toward this end the contacts K operate under the control of a cam 250 mounted on a shaft 252 whose rotation is in turn time-controlled in any suitable manner from the master clock of the synchronizing system.

It will be understood that the program device set forth in detail above has been designed for effecting a desired daily schedule. By this is meant a schedule where each day's schedule is identical or, at least, where certain days of the seven day week have identical schedules.

A typical schedule of this sort is given below:

| Daily Monday through Friday | Saturday | Sunday |
|---|---|---|
| 8:00 a. m. | 9:00 a. m. | ------ |
| 12:15 p. m. | 1:00 p. m. | ------ |
| 1:00 p. m. | -------- | ------ |
| 5:00 p. m. | -------- | ------ |

Such a schedule may well represent a conventional office routine program for employees wherein a six day week is observed with full working days Monday through Friday and a half day Saturday. The working day commences at 8:00 a. m. and ends at 5:00 p. m. Monday through Friday with three quarters of an hour for lunch between 12:15 p. m. and 1:00 p. m. On Saturday the working day commences at 9:00 a. m. and ends at 1:00 p. m. It is assumed that at the moments mentioned above, it is desired to ring a series of bells at various locations in a building including the bells Ba, Bb, Bc, Bd and Be but not Bf (Fig. 15).

To effect the desired program operations for the schedule given above, it is first necessary to prepare four program bars for the four repetitious week day program operations wherein the five bells are to be rung simultaneously at 8:00 a. m., 12:15 p. m., 1:00 p. m. and 5:00 p. m. Mondays through Fridays. Since it is also desired to ring these bells at 1:00 p. m. on Saturday, the program clip which serves the five other days of the week may also be utilized to perform its bell ringing function on Saturday and thus no additional program bar is required to perform this operation on Saturday. It is necessary however to prepare a fifth program bar to effect its bell ringing operation at 9:00 a. m. on Saturday. Thus five program bars must be prepared to perform the six differently timed bell ringing operations represented in the schedule. It should be borne in mind however that four of these differently timed operations are repetitious from Monday through Friday so that, in all, during the week, twenty two separately timed bell ringing operations involving the closing of one hundred and twenty bell circuits are resorted to and are accommodated by the five program bars which are prepared according to the schedule.

The prepared program bars are inserted in the various radial slots 64 of the end flanges 62 of the drum proper 56 in sequential relationship according to the particular time-of-day operation of the bars.

Figure 16:
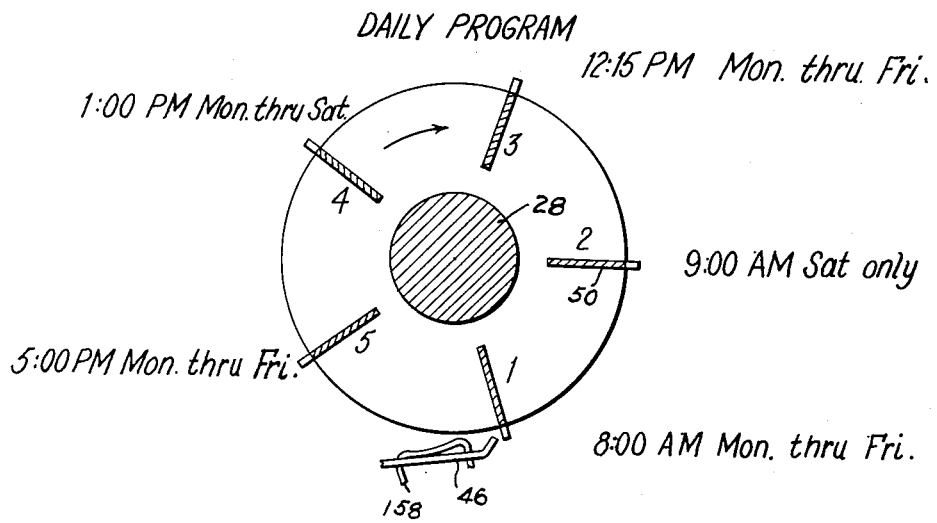
Fig. 16 is a schematic view showing the disposition of certain program bars in a program drum for effecting a predetermined daily schedule.

It will be remembered that provision is made for sixty such radial slots 64 and that minute torque impulses are applied to the drum assembly 30 which, ordinarily in the absence of any program bars, would result in rotating the drum a full revolution during each hour. Since each plural bell ringing operation in the schedule set forth above is removed from the preceding bell ringing operation by at least sixty minutes, it is immaterial to the proper operation of the program device where the various program bars are situated, providing of course that they are arranged in sequential time-of-day order. If desired, the five bars may be placed in any five adjacent slots or they may be widely separated. Preferably however, for convenience of identification upon inspection, they are substantially equally spaced at approximately 72° intervals around the drum in radial fashion as schematically illustrated in Fig. 16. In this view the program schedule of the above table has been indicated by the labeling of the various program bars and these bars in their sequential order around the periphery of the drum have been labeled 1, 2, 3, 4, and 5.

The program bar (1) which controls the ringing of the five bells B*a*, B*b*, B*c*, B*d* and B*e* on Monday through Friday at 8:00 a. m. will be prepared by breaking off the extreme right hand contact-closing tooth 48 and allowing the other five contact-closing teeth 48 to remain on the bar. The a. m. tooth 78 in the a. m., p. m., group will be broken away. The tooth labeled 8 in the hour group will be broken away. And the teeth labeled 0 in the tens and minutes groups will be broken away. Additionally, the teeth representing Monday through Friday will be broken away while the teeth representing Saturday and Sunday will remain on the bar.

The program bar (3) which controls the ringing of the bells at 12:15 p. m. on Monday through Friday will be similarly prepared except that the p. m. tooth in the a. m., p. m. group will be removed instead of the a. m. tooth. Also in the hour, tens and minute groups the teeth labeled 12, 1 and 5 respectively will be removed.

The program bar (4) which controls the ringing of the bells at 1:00 p. m. on week days including Saturday will differ from the preceding bars in that in the hour, tens and minute groups the teeth labeled 1, 0 and 0 respectively will be removed while at the same time the tooth representing Saturday in the day group will be removed.

The program bar (5) for controlling the 5:00 p. m. bells five days a week will be prepared with teeth labeled 5, 0 and 0 missing in the hour, tens and minute group respectively and with the teeth representing Monday through Friday in the day group removed.

The program bar (2) for controlling the ringing of a bell at 9:00 a. m. on Saturday will not have the teeth representing Monday through Friday or Sunday in the day section broken away but only the tooth representing Saturday in this group will be removed. This bar will also have the teeth labeled 9, 0 and 0 removed in the hours, tens and minutes groups respectively.

Since no bell ringing operations are resorted to on Sunday, no program bar will be inserted for this particular day.

After the various program bars have been prepared as outlined above, inserted in the program drum and the machine set into operation by the application of minute impulses to the shaft 104 a sequence of events will take place as follows:

If it is assumed that the program device is prepared and set into operation late on a Saturday evening for the following week's daily schedule given above, the minute impulses applied to the drum will advance the same in step-by-step fashion for a few minutes until such time as the first program bar (1) which is to effect the 8:00 a. m. bell ringing operation on Monday arrives at a point just in advance of its bell ringing position. At this point its further movement is prevented by the presence of teeth 78 thereon which are blocked by constantly shifting combinations of upraised stop fingers 80 in the a. m., p. m., hours, tens and minutes groups. This blocking operation will continue as the various stop fingers 80 are successively raised and lowered in the various groups until precisely 8:00 a. m. on Sunday. At this time the combination of teeth 80 will be such as to allow the drum to proceed upon an application of torque to the same. As the drum then advances one step, the five output circuits 1, 2, 3, 4 and 5 are potentially closed by virtue of the presence of the teeth 48 on the program bar but, since there is a tooth present representing Sunday in the day section, this tooth will engage the protuberance 160 (Fig. 5) of the arm 158 and hold the day contact D open. Since this contact D is in series with each of the output circuits, these circuits will not actually be closed and no bell ringing function will take place at 8:00 a. m. on Sunday.

After the first program bar (1) has been released by the stop fingers 80 each successive minute application of torque to the drum is effective to index the same and this indexing operation continues at minute intervals until a few minutes later when the second program bar (2) which controls the Saturday 9:00 a. m. bell ringing operation arrives at a point just in advance of its bell ringing position. Again the combinations of upraised stop fingers in the a. m., p. m., hour, tens and minutes groups presents a constantly but periodically shifting obstacle to the advance of the drum and the latter is blocked against advancement until precisely 9:00 a. m. on Sunday when the combinations of the various teeth will allow the drum to proceed. However, although the same five bell ringing output circuits again become potentially closed, the presence of a tooth in the Sunday position of the day group on the program will hold these circuits open as before and no bell ringing operations will take place at 9:00 a. m. on Sunday.

It should now be obvious that at 12:15 p. m., 1:00 p. m. and again at 5:00 p. m. on Sunday a similar situation will exist with the third and fourth and fifth program bars assuming the principal role in potentially effecting circuit closing operations that would ordinarily tend to produce bell ringing operations at these times but actually preventing these potential operations from becoming effective by opening the day contacts D by virtue of the presence of teeth in the Sunday positions of the day group of teeth on these program bars.

At 5:00 p. m. on Sunday the last program bar will be released by the combinations of stop fingers and teeth and the drum will be released to receive effectively the minute impulses or applications of torque. These impulses will within a few minutes, depending of course upon the particular spacing of the program bars, cause the drum to advance to a point where the first program bar is again presented to the stop fingers 80 and contact actuating fingers 82. The various combinations of stop fingers and teeth will remain effective during the remainder of Sunday and during the first portion of Monday up until precisely 8:00 a. m. At this time the stop fingers 80 will again release the program drum as the 8:00 a. m. torque impulse is applied to the latter and the drum will be indexed one step and, in so moving, the five teeth 48 which cooperate with the circuits A, B, C, D and E will engage their respective contact fingers 46 and close the contacts a, b, c, d and e (Fig. 15) and thus institute bell ringing operations in the manner previously described to sound the bells Ba, Bb, Bc, Bd, and Be at 8:00 a. m. on Monday. Since the program bar (1) is not provided with a tooth for cooperation with the sixth circuit F, the bell Bf will remain silent at this time.

Upon release of the drum at 8:00 a. m. Monday and the consequent ringing of the five bells according to the schedule, the drum will be periodically advanced at minute intervals until such time as the program bar (2) arrives in position and is blocked against further movement by the various combinations of stop fingers. At 9:00 a. m. this bar is released by the stop fingers but, since it is provided with a tooth representing Monday in the day section (as well as teeth representing Tuesday, Wednesday, Thursday and Friday), this tooth will engage the protuberance 160 (Fig. 5) and maintain the day contact D open and prevent bell ringing operations at this time.

When the drum is released at 9:00 a. m. on Monday without bell ringing functions, it will proceed by minute impulses until program bar (3) arrives in position and is arrested by the stop fingers 80. At 12:15 p. m. on Monday it will again be released by the combinations of stop fingers and teeth and this time upon release thereof it will perform its bell ringing functions inasmuch as the teeth 48 thereon will cooperate with the contact fingers 46 of circuits 1, 2, 3, 4 and 5 to close these circuits and initiate bell ringing functions at 12:15 p. m. Monday.

At 1:00 p. m. on Monday program bar (4) will function in a manner that by now should be obvious to cause the output circuits 1, 2, 3, 4 and 5 to become closed to ring the bells Ba, Bb, Bc, Bd and Be and at 5:00 p. m. the program bar (5) will perform a similar function.

After release of the program bar (5) at 5:00 p. m. on Monday which is attended by the desired bell ringing functions the drum will be advanced by minute torque impulses and within a few minutes it will arrive at a position wherein the first program bar (1) again comes into position and is arrested by the stop fingers 80. The drum will be held in this position for the balance of Monday and for the first portion of Tuesday up until 8:00 a. m. after which substantially the same operations as were effected on Monday will be repeated throughout Tuesday.

These same operations will also be repeated during Wednesday, Thursday and Friday but on Saturday at 8:00 a. m., 12:15 p. m., and 5:00 p. m. the bell ringing circuits will fail to operate inasmuch as a tooth 48 representing Saturday in the day section will be present on the first, third, and fifth program bars in the sequential series. The second program bar (2) will be effective at 9:00 a. m. on Saturday however to close the five bell ringing output circuits inasmuch as no tooth in the day section representing Saturday is present. Similarly, the program bar (4) will be effective at 1:00 p. m. on Saturday since the tooth representing Saturday is broken out. It will be remembered that that particular bar (2) will fail to function on the other week days or on Sunday due to the presence of teeth in the day section representing these particular days.

Thereafter, on Saturday the program bar (5) advanced as previously explained under the influence of the minute torque impulses, arrives at the stop fingers 80 and is released at 5:00 p. m. without bell ringing functions due to the presence of a tooth 48. The Sunday program will thereafter be carried out as previously described; that is, the drum being halted and released successively on Sunday at 8:00 a. m., 9:00 a. m., 12:15 p. m., 1:00 p. m. and 5:00 p. m. without any bell ringing functions since at each instance the D contacts will be held open by the presence of a tooth 48 engaging the protuberance 160 of the arm 158.

In order to adapt the program device which has been described above for use in carrying out a weekly program wherein the schedule for each day differs from the schedule for each other day a slight modification in the electrical and mechanical features of the invention may be resorted to. The electrical modifications consist in the omission of the day contact D and its operating instrumentalities while the mechanical modifications consist in the substitution for the day contact actuating instrumentalities of a set of stop fingers for cooperation with the day group of teeth on the program bars by the same combinational arrangements as exists in connection with the a. m., p. m., hour, tens and minute groups of teeth.

Such a modified program device has been illustrated in Fig. 13 and a sectional view taken transversely through the device in the vicinity of the day group of stop fingers would result in substantially the same disclosure as that of Fig. 4 with the exception that instead of the contact group F being visible, the contact group A would be apparent.

In Figs. 1 to 12, inclusive, representing a program device adapted for daily program use and in Fig. 13 representing a device adapted for weekly program use, similar characters of reference have been applied to the corresponding parts. An inspection of Fig. 13 will reveal that the day contacts D have been omitted together with its series of operating fingers 82 and that instead of the latter a series of stop fingers 80 have been substituted. In either form of the invention, the character of the program bars 50 remain the same.

The circuit diagram of Fig. 15 will accommodate either form of the invention and toward this end a plug connection P is shown for the purpose of shorting out the day contacts D when weekly program operations are resorted to.

A typical schedule for weekly operation wherein the daily program differs from day to day is given below:

| Sun. | Mon. | Tues. | Wed. | Thurs. | Fri. | Sat. |
| --- | --- | --- | --- | --- | --- | --- |
| -------- | 8:00 a. m. | 8:30 a. m. | 7:30 a. m. | 8:15 a. m. | 9:00 a. m. | ---- |
| -------- | 12:15 p. m. | 11:30 a. m. | 10:30 a. m. | 11:00 a. m. | 1:00 p. m. | ---- |
| -------- | 1:00 p. m. | 1:30 p. m. | 12:15 p. m. | 1:00 p. m. | -------- | ---- |
| -------- | 5:00 p. m. | 4:30 p. m. | 3:00 p. m. | 4:00 p. m. | -------- | ---- |

Figure 17:
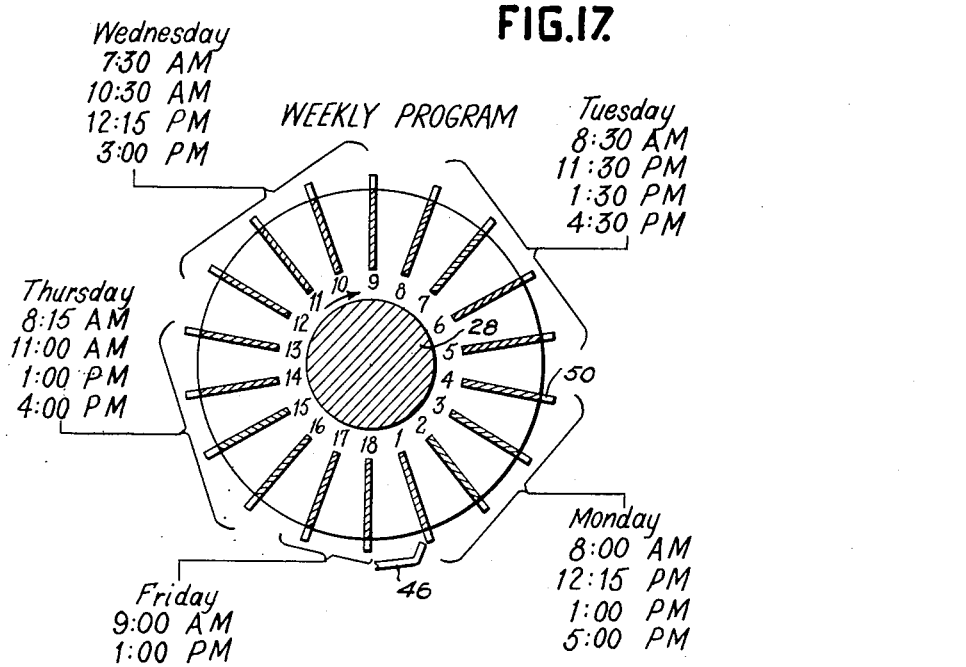
Fig. 17 is a schematic view similar to Fig. 16 in which the program bars effect a predetermined weekly schedule.

For such a program a separate program bar is prepared for each and every bell ringing operation and thus a total of eighteen program bars are utilized and inserted in the program drum in sequential order according to the time of week operation. Since no bell ringing operations are to take place on Saturday or on Sunday, no program bars need be prepared for these days. As before, it is immaterial to proper operation of the device where the various program bars are situated providing they are arranged in sequential order as stated above. In Fig. 17, the above weekly program schedule has been schematically illustrated.

In the preparation of the program bars 50, all those which are designed for operation on Monday will have the tooth representing Monday in the day section of the bars removed. All program bars designed for operation on Tuesday will have the tooth representing Tuesday in the day section removed. The same applies for the succeeding week days through Friday. No bars will be prepared for Saturady or Sunday. All of the bars are also prepared as previously described in connection with the other form of the invention for hour, tens of minutes and minute operation. For example, since it is desired to close the output circuits for the desired bells at 1:30 p. m. on Tuesday, the seventh program bar (7) in addition to having the tooth representing Tuesday in the day section removed, will have teeth representing p. m., 1, 3, and 0 removed from the a. m.–p. m., hour, tens and minutes sections respectively.

If, as in the case of the weekly program schedule, the program device is prepared and set into operation during the close of one week for operation the following week, as for example after 1:00 p. m. on Friday, the drum will immediately thereafter be indexed until such time as the first program bar (1) arrives in position and is blocked by a combination of stop fingers including the raised stop finger representing Friday in the day section of the device. At midnight Friday this stop finger will be lowered but immediately upon lowering thereof the stop finger representing Saturday will be raised and will remain raised all day Saturday to prevent the first program bar, from which only the Monday tooth in the day section has been removed, from being released. At midnight Saturday, the stop finger representing Sunday in the day section of the device will be raised to continue the obstructive combinational arrangement and this stop finger will remain effective all day Sunday. It will not be until 8:00 a. m. on Monday that a combinational condition exists whereby the first program bar (1) may be released to perform its bell ringing operations and within a few minutes thereafter when the second program bar (2) arrives in position, the combinational arrangement associated with the a. m.–p. m., hour, tens and minute sections of the device will be such that this second program bar will be arrested. Although the combinational arrangement will vary each minute thereafter, it will not release the second program bar until 12:15 p. m. when the absence of a tooth 78 representing Monday, the absence of a raised stop finger 80 representing p. m. time, and the absence of the 12 tooth in the hours section, the 1 tooth in the tens section and the 5 tooth in the minutes section, will be conducive toward release of the bar and consequent indexing of the program drum. As the drum is then indexed, the various circuit closing teeth 48 will cooperate with their respective contact fingers 46 to effect closing of the desired output circuits.

Following the above description to its logical conclusion, it will be appreciated that each program bar for the entire weekly program schedule will linger in its arrested position until such time as it is required for circuit closing operations. At 1:00 p. m. Friday the eighteenth last program bar will be released and the drum will proceed to a position wherein the first program bar is arrested and awaits release the following Monday at 8:00 a. m.

From the above description it is believed that the construction, operation, and many advantages of the herein described program device will become readily apparent and it will be appreciated that no particular skill or advanced mathematical knowledge is required for preparation of the various program bars and their substitution in the program drum to carry out any desired daily or weekly program schedule. A few simple precautions based upon common sense and judgment however must be borne in mind when setting up the program device for operation.

For example, although ordinarily it is immaterial where the prepared program bars are disposed about the periphery of the program drum, providing of course that proper sequential time-of-day and time-of-week order is maintained, where two circuit closing operations are expected to occur within a few minutes of each other it is necessary to insure that the two program bars for effecting these operations are spaced sufficiently close together on the drum that the second one may arrive at its operative circuit closing position on time to perform this function. If, for example, it is desired to ring a bell at 9:00 a. m. and to ring it again at 9:05 (which might well be the case for a military school program including "fall in" and "assembly" calls) it will be necessary that the second program bar be placed within the next succeeding five radial slots in the program drum. Otherwise this program bar would not arrive at its bell ringing position on time to perform its desired function. Similarly, if the device has been set up for operation at midnight on Saturday and it is desired to ring a bell at 12:08 a. m. on Sunday morning (which might well be the case for a program schedule in a parochial institution), it will be necessary that the first program bar in the daily or weekly schedule be inserted in one of the first eight slots in the program. It may be inserted in the very first slot if desired where it will be obstructed by the combinational arrangement for the next seven minutes, or it may be inserted in the eighth slot where it will arrive in position for bell ringing operations precisely in time to effect them, but it must not be inserted in the ninth slot or any slot thereafter. Otherwise, it will not be available at the proper time to effect its desired function.

The choice of the particular form of the invention which is best adapted to carry out a desired schedule may be determined by the provisions of a schedule itself. It should be remembered that with the daily program device in which the drum makes one revolution each day, the device is capable of performing as many as sixty separate timed circuit closing functions (utilizing plural or single circuits) during each day. Thus, four hundred and twenty such functions are the maximum possible for the entire week utilizing the program device illustrated herein. If special circuit closing functions are desired which differ from the repetitious series of functions on any particular day, a separate program bar and slot in the program drum must be reserved to accommodate each of such special functions, thus correspondingly reducing the maximum number of functions possible during each day and consequently during the week.

With the weekly program device, in which the drum makes one revolution during the course of a week, a separate program bar must be utilized for each and every timed circuit closing operation. With sixty slots in the drum, there are available for each day's circuit closing operations only eight program bars representing eight individual timed circuit closing operations. This leaves four program bars which may be employed to increase the bell ringing capacity of the device for one or more days of the week.

In the operative embodiment of the invention illustrated herein, means has been disclosed for periodically moving or indexing the drum at minute intervals in such a manner that, without obstruction, the drum would ordinarily complete a revolution at the end of each sixty minute period. It is obvious that since the disposition of teeth on the program drum bars and the time controlled movements of the various stop fingers are the controlling factors in obtaining proper timing for the closing of the output circuits, the rate of indexing of the drum is not critical. If desired, the drum may be indexed at more frequent intervals or it may be constantly driven at any desired speed with a suitable provision for permitting the stop fingers to arrest its movement without damaging the driving means.

Obviously, if larger capacities are required for any desired program schedule, the drum may be modified to make provision for a larger number of program bars and the device may otherwise be modified within the scope of the invention to perform whatever services are required of it.

While there have been shown and described and pointed out the fundamental novel features of the invention, as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a program device, a rotatable member having a contact-operating tooth thereon, a pair of normally open contacts positioned in the path of movement of said tooth and adapted to become closed by the latter in passing when the drum is rotated, means for applying a torque to said member tending to rotate the same, additional teeth on said rotatable member, a plurality of stop fingers, one for each of said latter teeth, said fingers each being movable from a retracted position out of the path of movement of its respective tooth to a projected position in the path of movement thereof and adapted when in said latter position to engage its respective tooth and render said torque applying means ineffective to rotate the member, and time controlled means for moving said stop fingers into and out of the path of movement of their respective teeth.

2. In a program device, a rotatable member having a contact-operating tooth thereon, a pair of normally open contacts positioned in the path of movement of said tooth and adapted to become closed by the latter in passing when the drum is rotated, means for applying a torque to said member tending to rotate the same, additional teeth on said rotatable member, a plurality of stop fingers, one for each of said latter teeth, said fingers each being movable from a retracted position out of the path of movement of its respective tooth to a projected position in the path of movement thereof and adapted when in said latter position to engage its respective tooth and render said torque applying means ineffective to rotate the member, and time controlled means for successively moving said stop fingers into and out of the path of movement of their respective teeth and for causing each finger to remain in its projected position until the next preceding finger has been moved to its projected position.

3. In a program device, a rotatable member having a contact-operating tooth thereon, a pair of normally open contacts positioned in the path of movement of said tooth and adapted to become closed by the latter in passing when the drum is rotated, means for applying a torque to said member tending to rotate the same, additional teeth on said rotatable member, a stop finger for each of said latter teeth normally occupying a retracted position out of the path of movement thereof and adapted to be projected into said path to engage the tooth and render said torque applying means ineffective to rotate the member, and time controlled means for successively projecting said stop fingers and for maintaining each finger projected until after the next preceding finger has been retracted.

4. In a program device, a rotatable member having a contact-operating tooth thereon, a pair of normally open contacts positioned in the path of movement of said tooth and adapted to become closed by the latter in passing when the drum is rotated, means for applying a torque to said member tending to rotate the same, additional teeth on said rotatable member, a stop finger for each of said latter teeth normally occupying a retracted position out of the path of movement thereof and adapted to be projected into said path to engage the tooth and render said torque applying means ineffective to rotate the member, cam means for successively projecting said stop fingers and for maintaining each finger projected until after the next preceding finger has been retracted, and time controlled means for actuating said cam means.

5. In a program device, a rotatable drum, means for applying a torque to said drum to rotate the same, a plurality of contact closing teeth carried by said drum, a plurality of pairs of normally open contacts positioned in the path of movement of said teeth and adapted to become closed by the latter in passing when the drum is rotated, a series of additional teeth carried by said drum and arranged in longitudinal alignment along the periphery of the latter at spaced positions therealong, a stop finger for each of said tooth positions normally occupying a retracted position out of the path of movement of said series of teeth and adapted to be individually projected into said path for engagement with a tooth in its respective tooth position, said stop fingers and series of teeth operating in the manner of a combination to render said torque applying means ineffective to rotate the drum during engagement between one or more of said stop fingers and teeth and to permit the torque applying means to be effective in the absence of such engagement, and time controlled means for moving said stop fingers.

6. In a program device, a rotatable drum, means for applying a torque to said drum to rotate the same, a plurality of contact closing teeth carried by said drum, a plurality of pairs of normally open contacts positioned in the path of movement of said teeth and adapted to become closed by the latter in passing when the drum is rotated, a series of additional teeth carried by said drum and arranged in longitudinal alignment along the periphery of the latter at spaced positions therealong, a stop finger for each of said tooth positions normally occupying a retracted position out of the path of movement of said series of teeth and adapted to be individually projected into said path for engagement with a tooth in its respective tooth position, said stop fingers and series of teeth operating in combinational arrangements to render said torque applying means ineffective to rotate the drum during engagement between one or more of said stop fingers and teeth and to permit the torque applying means to be effective in the absence of such engagement, and time controlled means for projecting said stop fingers in succession and for causing each finger to remain so projected until the next preceding finger has been moved to its retracted position.

7. In a program device, a rotatable drum, means for applying a torque to said drum to rotate the same, a plurality of contact closing teeth carried by said drum, a pair of normally open contacts positioned in the path of movement of said teeth and adapted to become closed by the latter in passing when the drum is rotated, a plurality of series of additional teeth carried by said drum and arranged in rows at spaced positions in longitudinal alignment along the periphery of the drum with the various rows being circumferentially spaced on the periphery of the drum and with the various tooth positions of each row being in circumferential alignment, a stop finger for each line of tooth positions, said fingers being arranged in alignment and normally occupying retracted positions out of the path of movement of said series of teeth and adapted to be individually projected into said path for engagement with a tooth in its respective line of tooth positions, said stop fingers and series of teeth operating in combinational arrangements to render said torque applying means ineffective to rotate the drum during engagement between one or more of said fingers and teeth and to permit the torque applying means to be effective in the absence of such engagement, and time controlled means for moving said stop fingers.

8. In a program device, a rotatable drum, means for applying a torque to said drum to rotate the same, a plurality of contact closing teeth carried by said drum, a pair of normally open contacts positioned in the path of movement of said teeth and adapted to become closed by the latter in passing when the drum is rotated, a plurality of series of additional teeth carried by said drum and arranged in rows at spaced positions in longitudinal alignment along the periphery of the drum with the various rows being circumferentially spaced on the periphery of the drum and with the various tooth positions of each row being in circumferential alignment, a stop finger for each line of tooth positions, said fingers being arranged in alignment and normally occupying retracted positions out of the path of movement of said series of teeth and adapted to be individually projected into said path for engagement with a tooth in its respective line of tooth positions, said stop fingers and series of teeth operating in combinational arrangements to render said torque applying means ineffective to rotate the drum during engagement between one or more of said fingers and teeth and to permit the torque applying means to be effective in the absence of such engagement, and time controlled means for successively projecting said stop fingers and for causing each finger to remain so projected until the next preceding finger has been moved to its retracted position.

9. In a program device, a rotatable drum, means for applying a torque to said drum to rotate the same, a plurality of contact closing teeth carried by said drum, a plurality of pairs of normally open contacts positioned in the path of movement of said teeth and adapted to become closed by the latter in passing when the drum is rotated, a series of additional teeth carried by said drum and arranged in longitudinal alignment along the periphery of the latter at spaced positions therealong, a stop finger for each of said tooth positions normally occupying a retracted position out of the path of movement of said series of teeth and adapted to be individually projected into said path for engagement with a tooth in its respective tooth position, said stop fingers and teeth being arranged in four cooperating groups and operating in combinational arrangements to render said torque applying means ineffective to rotate the drum during engagement between one or more of said stop fingers and teeth and to permit the torque applying means to be effective in the absence of such engagement, and time controlled means for projecting the stop fingers of each group in succession at different time intervals and for causing each finger in each group to remain projected until the next succeeding finger in the same group has been moved to its retracted position.

10. In a program device, a rotatable drum, means for applying a torque to said drum to rotate the same, a plurality of contact closing teeth carried by said drum, a plurality of pairs of normally open contacts positioned in the path of movement of said teeth and adapted to become closed by the latter in passing when the drum is rotated, a series of additional teeth carried by said drum and arranged in longitudinal alignment along the periphery of the latter at spaced positions therealong, a stop finger for each of said tooth positions normally occupying a retracted position out of the path of movement of said series of teeth and adapted to be individually projected into said path for engagement with a tooth in its respective tooth position, said stop fingers and teeth being arranged in four cooperating groups and operating in combinational arrangements to render said torque applying means ineffective to rotate the drum during engagement between one or more of said stop fingers and teeth and to permit the torque applying means to be effective in the absence of such engagement, and time controlled means for projecting the stop fingers of one group in succession at one minute intervals and allowing the same to remain projected for one minute, for projecting the stop fingers of another group at ten minute intervals and allowing the same to remain projected for ten minutes, for projecting the stop fingers of another group at hour intervals and allowing the same to remain projected for one hour, and for projecting the stop fingers of the last group at twelve hour intervals and allowing the same to remain projected for twelve hours.

11. In a program device, a rotatable drum, means for applying a torque to said drum to rotate the same, a plurality of contact closing teeth carried by said drum, a plurality of pairs of normally open contacts positioned in the path of movement of said teeth and adapted to become closed by the latter in passing when the drum is rotated, a series of additional teeth carried by said drum and arranged in longitudinal alignment along the periphery of the latter at spaced positions therealong, a stop finger for each of said tooth positions normally occupying a retracted position out of the path of movement of said series of teeth and adapted to be individually projected into said path for engagement with a tooth in its respective tooth position, said stop fingers and teeth being arranged in five cooperating groups and operating combinationally to render said torque applying means ineffective to rotate the drum during engagement between one or more of said stop fingers and teeth and to permit the torque applying means to be effective in the absence of such engagement and time controlled means for projecting the stop fingers of one group in succession at one minute intervals and allowing the same to remain projected for one minute, for projecting the stop fingers of another group at ten minute intervals and allowing the same to remain projected for ten minutes, for projecting the stop fingers of another group at hour intervals and allowing the same to remain projected for one hour, for projecting the stop fingers of another group at twelve hour intervals and allowing the same to remain projected for twelve hours, and for projecting the stop fingers of the last group at twenty four hour intervals and allowing the same to remain projected for twenty four hours.

12. In a program device, a rotatable drum, a plurality of substantially flat program bars, means on said drum for removably and interchangeably supporting said program bars thereon in radially disposed positions with the outer edges of the bars arranged in parallelism at circumferentially spaced positions, means for applying a torque to said drum to rotate the same, a contact closing tooth formed on the outer edge of each bar, a pair of normally open contacts positioned in the path of movement of said teeth and adapted to become closed by the latter in passing when the drum is rotated, a series of additional teeth formed on the outer edge of each bar at spaced positions therealong, a stop finger for each tooth position, said fingers normally occupying a retracted position out of the path of movement of said series of teeth and adapted to be individually projected into said path for engagement with a tooth in its respective position, said stop fingers and series of teeth operating in combinational arrangements to render said torque applying means ineffective to rotate the drum during engagement between one or more of said stop fingers and teeth and to permit the torque applying means to be effective in the absence of such engagement, and time controlled means for successively projecting projecting said stop fingers and for causing each finger to remain so projected until the next preceding finger has been moved to its retracted position, the teeth on said program bars in said series being frangible for removal purposes to vary the combinations.

13. In a program device, a rotatable drum, a plurality of substantially flat program bars, means on said drum for removably and interchangeably supporting said program bars thereon in radially disposed positions with the outer edges of the bars arranged in parallelism at circumferentially spaced positions, means for applying a torque to said drum to rotate the same, a plurality of spaced contact closing teeth formed on the outer edge of each bar, a pair of normally open contacts positioned in the path of movement of said teeth and adapted to become closed by the latter in passing when the drum is rotated, a series of additional teeth formed on the outer edge of each bar at spaced positions therealong, a stop finger for each tooth position, said fingers normally occupying a retracted position out of the path of movement of said series of teeth and adapted to be individually projected into said path for engagement with a tooth in its respective position, said stop fingers and series of teeth operating in combination to render said torque applying means ineffective to rotate the drum during engagement between one or more of said stop fingers and teeth and to permit the torque applying means to be effective in the absence of such engagement, and time controlled means for successively projecting said stop fingers and for causing each finger to remain so projected until the next preceding finger has been moved to its retracted position, all of the teeth on said program bar being frangible for removal purposes to vary combinations to selectively control the closing of said circuits.

14. In a program device of the character described, a rotatable drum construction comprising in combination a spool-like member having radial end flanges formed with a series of opposed narrow internal radial slots therein arranged in pairs, a series of substantially flat elongated program bars removably and interchangeably disposed on said drum with their end portions received in said pairs of slots and having frangible circuit closing teeth disposed on their outer edges designed for cooperation with respective pairs of circuit controlling contacts positioned in their respective paths of movement.

15. In a program device of the character described, a rotatable drum construction comprising in combination a spool-like member having radial end flanges formed with a series of opposed narrow internal radial slots therein arranged in pairs, a series of substantially flat elongated program bars removably and interchangeably disposed on said drum with their end portion received in said pairs of slots and having frangible circuit closing teeth disposed on their outer edges designed for cooperation with respective pairs of circuit controlling contacts positioned in their respective paths of movement, the bottoms of the slots of each pair having different irregular configurations and the bars having end portions which are complementary in configuration to the bottom of said slots whereby reversal of the position of said bars in their respective pairs of slots is prevented.

16. In a program device of the character described, a rotatable drum construction comprising in combination a spool-like member having radial end flanges formed with a series of opposed narrow internal radial slots therein arranged in pairs, a series of substantially flat elongated program bars removably and interchangeably disposed on said drum with their end portions received in said pairs of slots and having frangible circuit closing teeth disposed on their outer edges designed for cooperation with respective pairs of circuit controlling contacts positioned in their respective paths of movement, and a radially extending flange positioned medially of the drum and having radially disposed slots formed therein for the reception and support of the medial portions of the inner edges of said program bars.

17. In a program device, a rotatable member having a contact-operating tooth thereon, a pair of normally open contacts positioned in the path of movement of said tooth and adapted to become closed by the latter in passing when the drum is rotated, a second contact-operating tooth on said rotatable member, a second pair of normally open contacts normally occupying a position out of the path of movement of said latter tooth and operable upon closing thereof to be projected into said path and adapted to become opened by engagement with said latter tooth in passing when the member is rotated, an output circuit in which said pairs of contacts are disposed in series relationship, means for applying a torque to said rotatable member to rotate the same, time controlled means for controlling the rotational movements of the member under the influence of said torque applying means, and time controlled means for periodically closing said second pair of contacts.

18. In a program device, a rotatable member having a contact-operating tooth thereon, a pair of normally open contacts positioned in the path of movement of said tooth and adapted to become closed by the latter in passing when the drum is rotated, a second contact-operating tooth on said rotatable member, a second pair of normally open contacts normally occupying a position out of the path of movement of said latter tooth and operable upon closing thereof to be projected into said path and adapted to become opened by engagement with said latter tooth in passing when the member is rotated, an output circuit in which said pairs of contacts are disposed in series relationship, means for applying a torque to said rotatable member to rotate the same, time controlled means for controlling the rotational movements of the member under the influence of said torque applying means, a third tooth on said rotatable member, a stop finger movable from a position out of the path of movement of said third tooth to a position in the path of movement thereof to render said torque applying means ineffective to rotate the member, time controlled means for moving said stop finger into and out of the path of movement of said third tooth, and time controlled means for periodically closing said second pair of contacts.

19. In a program device, a rotatable drum, means for applying a torque to said drum to rotate the same, a plurality of contact-closing teeth carried by said drum, a pair of normally open contacts for each tooth positioned in the path of movement thereof and adapted to become closed by the latter in passing when the drum is rotated, a series of contact-opening teeth on said drum, a pair of normally open contacts common to said contact-opening teeth normally occupying a retracted position out of the paths of movement thereof and operable upon closing to become projected into said paths to become opened by engagement with any one or more of said contact-opening teeth, an output circuit for each of said first mentioned pairs of contacts and in which the latter is disposed, said second mentioned pair of contacts being common to all of said output circuits and arranged in each of them in series with one of said first mentioned pairs of contacts, time controlled means for controlling the rotational movements of the drum under the influence of said torque applying means, and time controlled means for periodically closing said second mentioned pair of contacts.

20. In a program device, a rotatable drum, means for applying a torque to said drum to rotate the same, a plurality of contact-closing teeth carried by said drum, a pair of normally open contacts for each tooth positioned in the path of movement thereof and adapted to become closed by the latter in passing when the drum is rotated, a series of contact-opening teeth on said drum, a pair of normally open contacts common to said contact-opening teeth normally occupying a retracted position out of the paths of movement thereof and operable upon closing to become projected into said paths to become opened by engagement with any one or more of said contact-opening teeth, an output circuit for each of said first mentioned pairs of contacts and in which the latter is disposed, said second mentioned pair of contacts being common to all of said output circuits and arranged in each of them in series with one of said first mentioned pairs of contacts, time controlled means for controlling the rotational movements of the drum under the influence of said torque applying means, a series of additional teeth on said drum, a stop finger for each of said additional teeth normally occupying a position out of the path of movement thereof and adapted to be individually projected into said path, said stop fingers and their respective teeth operating in combinational arrangements to render said torque applying means ineffective to rotate the drum during engagement between one or more of said fingers and teeth and to permit the torque applying means to be effective in the absence of such engagement, time controlled means for moving said stop fingers, and time controlled means for periodically closing said second mentioned pair of contacts.

21. In a program device, a rotatable drum, means for applying a torque to said drum to rotate the same, a plurality of contact-closing teeth carried by said drum, a pair of normally open contacts for each tooth positioned in the path of movement thereof and adapted to become closed by the latter in passing when the drum is rotated, a series of contact-opening teeth on said drum, a pair of normally open contacts common to said contact-opening teeth normally occupying a retracted position out of the paths of movement thereof and operable upon closing to become projected into said paths to become opened by engagement with any one or more of said contact-opening teeth, an output circuit for each of said first mentioned pairs of contacts and in which the latter is disposed, said second mentioned pair of contacts being common to all of said output circuits and arranged in each of them in series with one of said first mentioned pairs of contacts, time controlled means for controlling the rotational movements of the drum under the influence of said torque applying means, a series of additional teeth on said drum, a stop finger for each of said additional teeth normally occupying a position out of the path of movement thereof and adapted to be individually projected into said path, said stop fingers and their respective teeth operating in combinational arrangements to render said torque applying means ineffective to rotate the drum during engagement between one or more of said fingers and teeth and to permit the torque applying means to be effective in the absence of such engagement, time controlled means for successively projecting said stop fingers in succession and for causing each finger to remain so projected until the next preceding finger has been moved to its retracted position, and time controlled means for periodically closing said second mentioned pair of contacts.

22. In a program device, a rotatable drum, means for applying a torque to said drum to rotate the same, a plurality of contact-closing teeth carried by said drum, a pair of normally open contacts for each tooth positioned in the path of movement thereof and adapted to become closed by the latter in passing when the drum is rotated, a series of contact-opening teeth on said drum, a pair of normally open contacts common to said contact-opening teeth normally occupying a retracted position out of the paths of movement thereof and operable upon closing to become projected into said paths to become opened by engagement with any one or more of said contact-opening teeth, an output circuit for each of said first mentioned pairs of contacts and in which the latter is disposed, said second mentioned pair of contacts being common to all of said output circuits and arranged in each of them in series with one of said first mentioned pairs of contacts, time controlled means for controlling the rotational movements of the drum under the influence of said torque applying means, a series of additional teeth on said drum, a stop finger for each of said additional teeth normally occupying a position out of the path of movement thereof and adapted to be individually projected into said path, said stop fingers and their respective teeth operating in combinational arrangements to render said torque applying means ineffective to rotate the drum during engagement between one or more of said fingers and teeth and to permit the torque applying means to be effective in the absence of such engagement, time controlled means for projecting said stop fingers in succession and for causing each finger to remain so projected until the next preceding finger has been moved to its retracted position, and time controlled means for periodically closing said second mentioned pair of contacts and for projecting them successively into the paths of movement of said contact-opening teeth and for causing them to remain projected in the path of each tooth until after they have also been projected into the path of another of said teeth.

23. In a program device, a rotatable drum, means for applying a torque to said drum to rotate the same, a plurality of contact-closing teeth carried by said drum, a pair of normally open contacts for each tooth positioned in the path of movement thereof and adapted to become closed by the latter in passing when the drum is rotated, a series of contact-opening teeth on said drum, and arranged in longitudinal alignment along the periphery of the latter at spaced positions therealong, a pair of normally open contacts common to said contact-opening teeth normally occupying a retracted position out of the paths of movement thereof and operable upon closing to become projected into said paths to become opened by engagement with one or more of said contact-opening teeth in its respective tooth position, an output circuit for each of said first mentioned pairs of contacts and in which the latter is disposed, said second mentioned pair of contacts being common to all of said output circuits and arranged in each of them in series with one of said first mentioned pairs of contacts, time controlled means for controlling the rotation of the drum under the influence of said torque applying means, a series of additional teeth on said drum arranged in alignment along the periphery of the latter at spaced positions therealong, a stop finger for each of said tooth positions normally occupying a retracted position out of the path of movement of said series of additional teeth and adapted to be individually projected into said path for engagement with a tooth in its respective tooth position, said fingers and cooperating teeth operating in combinational arrangements to render said torque applying means ineffective to rotate the drum during engagement between one or more of said stop fingers and teeth and to permit the torque applying means to be effective in the absence of such engagement, time controlled means for projecting said stop fingers in succession and for causing each finger to remain so projected until the next preceding finger has been moved to its retracted position, and time controlled means for periodically closing said second mentioned pair of contacts and for projecting them successively into the paths of movement of said contact-opening teeth and for causing them to remain projected in the path of each tooth until after they have also been projected into the path of the next succeeding tooth in the series.

24. In a program device, a rotatable drum, means for applying a torque to said drum to rotate the same, a plurality of contact-closing teeth carried by said drum, a pair of normally open contacts for each tooth positioned in the path of movement thereof and adapted to become closed by the latter in passing when the drum is rotated, a series of contact-opening teeth on said drum, a pair of normally open contacts common to said contact-opening teeth normally occupying a retracted position out of the paths of movement thereof and operable upon closing to become projected into said paths to become opened by engagement with any one or more of said contact-opening teeth, an output circuit for each of said first mentioned pairs of contacts and in which the latter is disposed, said second mentioned pair of contacts being common to all of said output circuits and arranged in each of them in series with one of said first mentioned pairs of contacts, time controlled means for controlling the rotational movements of the drum under the influence of said torque applying means, a series of additional teeth on said drum, a stop finger for each of said additional teeth normally occupying a position out of the path of movement thereof and adapted to be individually projected into said path, said stop fingers and their respective teeth operating in combination to render said torque applying means ineffective to rotate the drum during engagement between one or more of said fingers and teeth and to permit the torque applying means to be effective in the absence of such engagement, means operable when said torque applying means is ineffective to rotate the drum for maintaining said output circuits open and for permitting said circuits to become closed under the influence of their respective contact-closing teeth and cooperating contacts when said torque applying means is effective to rotate the drum, time controlled means for moving said stop fingers, and time controlled means for periodically closing said second mentioned pair of contacts.

25. In a program device, a rotatable drum, means for applying a torque to said drum to rotate the same, a plurality of contact-closing teeth carried by said drum, a pair of normally open contacts for each tooth positioned in the path of movement thereof and adapted to become closed by the latter in passing when the drum is rotated, a series of contact-opening teeth on said drum, a pair of normally open contacts common to said contact-opening teeth normally occupying a retracted position out of the paths of movement thereof and operable upon closing to become projected into said paths to become opened by engagement with any one or more of said contact-opening teeth, an output circuit for each of said first mentioned pairs of contacts and in which the latter is disposed, said second mentioned pair of contacts being common to all of said output circuits and arranged in each of them in series with one of said first mentioned pairs of contacts, time controlled means for controlling the rotational movements of the drum under the influence of said torque applying means, a series of additional teeth on said drum, a stop finger for each of said additional teeth normally occupying a position out of the path of movement thereof and adapted to be individually projected into said path, said stop fingers and their respective teeth operating in combination to render said torque applying means ineffective to rotate the drum during engagement between one or more of said fingers and teeth and to permit the torque applying means to be effective in the absence of such engagement, means operable when said torque applying means is ineffective to rotate the drum for maintaining said output circuits open and for permitting said circuits to become closed under the influence of their respective contact-closing teeth and cooperating contacts when said torque applying means is effective to rotate the drum, time controlled means for successively projecting said stop fingers in succession and for causing each finger to remain so projected until the next preceding finger has been moved to its retracted position, and time controlled means for periodically closing said second mentioned pair of contacts.

26. In a program device, a rotatable drum, means for applying a torque to said drum to rotate the same, a plurality of contact-closing teeth carried by said drum, a pair of normally open contacts for each tooth positioned in the path of movement thereof and adapted to become closed by the latter in passing when the drum is rotated, a series of contact-opening teeth on said drum, a pair of normally open contacts common to said contact-opening teeth normally occupying a retracted position out of the paths of movement thereof and operable upon closing to become projected into said paths to become opened by engagement with any one or more of said contact-opening teeth, an output circuit for each of said first mentioned pairs of contacts and in which the latter is disposed, said second mentioned pair of contacts being common to all of said output circuits and arranged in each of them in series with one of said first mentioned pairs of contacts, time controlled means for controlling the rotational movements of the drum under the influence of said torque applying means, a series of additional teeth on said drum, a stop finger for each of said additional teeth normally occupying a position out of the path of movement thereof and adapted to be individually projected into said path, said stop fingers and their respective teeth operating in combination to render said torque applying means ineffective to rotate the drum during engagement between one or more of said fingers and teeth and to permit the torque applying means to be effective in the absence of such engagement, means operable when said torque applying means is ineffective to rotate the drum for maintaining said output circuits open and for permitting said circuits to become closed under the influence of their respective contact-closing teeth and cooperating contacts when said torque applying means is effective to rotate the drum, time controlled means for successively projecting said stop fingers in succession and for causing each finger to remain so projected until the next preceding finger has been moved to its retracted position, and time controlled means for periodically closing said second mentioned pair of contacts, and for projecting them successively into the paths of movement of said contact-opening teeth and for causing them to remain projected in the path of each tooth until after they have also been projected into the path of another of said teeth.

27. In a program device, a plurality of normally open output circuits, a support, a drum rotatably mounted on the support, means for applying a torque to said drum to rotate the same, means operable as the drum moves past predetermined selected positions for selectively closing said circuits, a series of selectively removable combination members carried by the drum and movable therewith, a series of cooperating combination members mounted on the support, said combination members being arranged in cooperating pairs, the members on the support normally occupying positions out of the path of movement of their respective cooperating members on the drum, and time controlled means for repeatedly projecting the members on the support successively into the paths of movement of their respective cooperating members on the drum for blocking engagement with the latter to render said torque applying means ineffective to rotate the drum when such blocking engagement between the cooperating members exists.

28. In a program device, a plurality of normally open output circuits, a support, a drum rotatably mounted on the support, means for applying a torque to said drum to rotate the same, means operable as the drum moves past predetermined selected positions for selectively closing said circuits, a series of selectively removable combination members carried by the drum and movable therewith, a series of cooperating combination members mounted on the support, said combination members being arranged in cooperating pairs, the members on the support normally occupying positions out of the path of movement of their respective cooperating members on the drum, and time controlled means for repeatedly projecting the members on the support successively into the paths of movement of their respective cooperating members on the drum and for maintaining them so projected for a period of one minute each to establish blocking engagement between the members to render said torque applying means ineffective to rotate the drum when such blocking engagement exists.

29. In a program device, a plurality of normally open output circuits, a support, a drum rotatably mounted on the support, means for applying a torque to said drum to rotate the same, means operable as the drum moves past predetermined selected positions for selectively closing said circuits, a series of selectively removable combination members carried by the drum and movable bodily therewith, a series of cooperating combination members on the support, said members being arranged in cooperating pairs, the members on the support normally occupying positions out of the paths of movement of their respective cooperating members on the drum, said pairs of cooperating members being arranged in a plurality of groups, one group representing minutes of clock time, another group representing tens of minutes of clock time, and a third group representing hours of clock time, time controlled means for repeatedly projecting the members of the minutes group on the support successively at minute intervals into the paths of movement of their cooperating members on the drum, time controlled means for repeatedly projecting the members of the tens of minutes group on the support successively at ten minute intervals into the paths of movement of their cooperating members on the drum, and time controlled means for repeatedly projecting the members of the hours group on the support successively at hour intervals into the paths of movement of their co-operating members on the drum, such projection of the members on the support being for the purpose of blocking engagement with the respective members on the drum to render said torque applying means ineffective to rotate the drum during such blocking engagement.

30. In a program device, a plurality of normally open output circuits, a support, a drum rotatably mounted on the support, means for applying a torque to said drum to rotate the same, means operable as the drum moves past predetermined selected positions for selectively closing said circuits, a series of selectively removable combination members carried by the drum and movable bodily therewith, a series of cooperating combination members on the support, said members being arranged in cooperating pairs, the members on the support normally occupying positions out of the paths of movement of their respective cooperating members on the drum, said pairs of cooperating members being arranged in a plurality of groups, one group representing minutes of clock time, another group representing tens of minutes of clock time, another group representing hours of clock time, another group representing twelve hour intervals of clock time, time controlled means for repeatedly projecting the members of the minutes group on the support successively at minute intervals into the paths of movement of their cooperating members on the drum, time controlled means for repeatedly projecting the members of the tens of minutes group on the support successively at ten minute intervals into the paths of movement of their cooperating members on the drum, time controlled means for repeatedly projecting the members of the hours group on the support successively at hour intervals into the paths of movement of their cooperating members on the drum, and time controlled means for alternately projecting the members of the twelve hour intervals group on the support at twelve hour intervals into the paths of movement of their cooperating members on the drum, such projection of the members on the support being for the purpose of blocking engagement with the respective members on the drum to render said torque applying means ineffective to rotate the drum when such blocking engagement exists.

31. In a program device, a plurality of normally open output circuits, a support, a drum rotatably mounted on the support, means for applying a torque to said drum to rotate the same, means operable as the drum moves past predetermined selected positions for selectively closing said circuits, a series of selectively removable combination members carried by the drum and movable bodily therewith, a series of cooperating combination members on the support, said members being arranged in cooperating pairs, the members on the support normally occupying positions out of the paths of movement of their respective cooperating members on the drum, said pairs of cooperating members being arranged in a plurality of groups, one group representing minutes of clock time, another group representing tens of minutes of clock time, another group representing hours of clock time, another group representing twelve hour intervals of clock time, another group representing twenty four hour intervals of clock time, time controlled means for repeatedly projecting the members of the minutes group on the support successively at minute intervals into the paths of movement of their cooperating members on the drum, time controlled means for repeatedly projecting the members of the tens of minutes group on the support successively at ten minute intervals into the paths of movement of their cooperating members on the drum, time controlled means for repeatedly projecting the members of the hours group on the support successively at hour intervals into the paths of movement of their cooperating members on the drum, time controlled means for alternately projecting the members of the twelve hour intervals group on the support at twelve hour intervals into the paths of movement of their cooperating members on the drum, and time controlled means for repeatedly projecting the members of the twenty four hour intervals group on the support successively at twenty four hour intervals into the paths of their respective cooperating members on the drum, such projection of the members on the support being for the purpose of blocking engagement with the respective members on the drum to render said torque applying means ineffective to rotate the drum when such blocking engagement exists.

32. In a program device, a support, a rotary contact-closing drum mounted on said support, a series of combination members carried by the drum and bodily movable therewith, a series of cooperating combination members on the support, said members being arranged in cooperating pairs, the members on the support normally occupying positions out of the paths of movement of their respective cooperating members on the drum, said pairs of cooperating members being arranged in a plurality of groups, one group representing intervals of clock time and another group representing different intervals of clock time, a rotary cam member cooperating with the members of one group to project the same successively at predetermined intervals into the paths of movement of their respective cooperating members on the drum, a rotary cam member cooperating with the members of the tens of minutes group to project the same successively at other predetermined intervals into the paths of movement of their respective cooperating members on the drum, driving mechanism for said rotary cam members, a plurality of conductors each adapted to supply impulses for causing actuation of said driving mechanism, and switching means under the control of said rotary cam members for selectively determining which of said conductors shall control the actuation of said driving mechanism.

33. In a program device, a plurality of output circuits, a support, a drum rotatably mounted on said support, means for applying a torque to said drum to rotate the same, means operable as the drum moves past predetermined selected positions for selectively controlling said circuits, a series of combination members carried by the drum, a series of cooperating combination members mounted on the support, and time controlled means for shifting the positions of the combination members on the support whereby they will move combinationally into and out of blocking engagement with the members on the drum either to render said torque applying means ineffective or effective to rotate the drum.

34. In a program device, a rotatable member having a contact-operating tooth thereon, a pair of normally open contacts positioned in the path of movement of said tooth and adapted to become closed by the latter in passing when the member is rotated, means for applying a torque to said member tending to rotate the same, additional teeth on said rotatable member, a plurality of stop fingers, one for each of said latter teeth, said fingers each being movable from a retracted position out of the path of movement of its respective tooth to a projected position in the path of movement thereof and adapted when in said latter position to engage its respective tooth and render said torque applying means ineffective to rotate the member, and time controlled means for moving said stop fingers into and out of the path of movement of their respective teeth.

35. In a program device, a rotatable member having a contact-operating tooth thereon, a pair of normally open contacts positioned in the path of movement of said tooth and adapted to become closed by the latter in passing when the member is rotated, means for applying a torque to said member tending to rotate the same, additional teeth on said rotatable member, a plurality of stop fingers, one for each of said latter teeth, said fingers each being movable from a retracted position out of the path of movement of its respective tooth to a projected position in the path of movement thereof and adapted when in said latter position to engage its respective tooth and render said torque applying means ineffective to rotate the member, and time controlled means for successively moving said stop fingers into and out of the path of movement of their respective teeth and for causing each finger to remain in its projected position until the next preceding finger has been moved to its projected position.

36. In a program device, a rotatable member having a contact-operating tooth thereon, a pair of normally open contacts positioned in the path of movement of said tooth and adapted to become closed by the latter in passing when the member is rotated, means for applying a torque to said member tending to rotate the same, additional teeth on said rotatable member, a stop finger for each of said latter teeth normally occupying a retracted position out of the path of movement thereof and adapted to be projected into said path to engage the tooth and render said torque applying means ineffective to rotate the member, and time controlled means for successively projecting said stop fingers and for maintaining each finger projected until after the next preceding finger has been retracted.

37. In a program device, a rotatable member having a contact-operating tooth thereon, a pair of normally open contacts positioned in the path of movement of said tooth and adapted to become closed by the latter in passing when the member is rotated, means for applying a torque to said member tending to rotate the same, additional teeth on said rotatable member, a stop finger for each of said latter teeth normally occupying a retracted position out of the path of movement thereof and adapted to be projected into said path to engage the tooth and render said torque applying means ineffective to rotate the member, cam means for successively projecting said stop fingers and for maintaining each finger projected until after the next preceding finger has been retracted, and time controlled means for actuating said cam means.

38. The combination in a program device of a movable carrier, means for providing motion to the carrier to move it in a predetermined path, contact-operating fingers fixed in a predetermined pattern on the said carrier, control elements detachably fixed to the said carrier and extending therefrom, interposers co-acting with the said control elements, the said interposers being variously positionable with respect to the said elements, and positioning means for controlling the said interposers to move into the path of the said control elements when the said carrier is moved for holding up the motion of the said carrier.

REYNOLD B. JOHNSON.

REFERENCES CITED

The following references are of record in the file of this patent:

UNITED STATES PATENTS

| Number | Name | Date |
| --- | --- | --- |
| 438,653 | Striemer | Oct. 21, 1890 |
| 1,172,080 | Voigt | Feb. 15, 1916 |